US012802692B2

(12) United States Patent
Sanyal et al.

(10) Patent No.: US 12,802,692 B2
(45) Date of Patent: Nov. 17, 2026

(54) SYSTEM AND METHOD FOR DISTINGUISHING ORIGINAL VOICE FROM SYNTHETIC VOICE IN AN IoT ENVIRONMENT

(71) Applicant: SAMSUNG ELECTRONICS CO., LTD., Suwon-si (KR)

(72) Inventors: Subhasis Sanyal, Noida (IN); Mohit Kumar Barai, Noida (IN); Arif Samad, Noida (IN); Yash Beniwal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 18/733,524

(22) Filed: Jun. 4, 2024

(65) Prior Publication Data

US 2024/0428801 A1 Dec. 26, 2024

Related U.S. Application Data

(63) Continuation of application No. PCT/IB2024/054070, filed on Apr. 26, 2024.

(30) Foreign Application Priority Data

Jun. 23, 2023 (IN) ............................ 202311041861

(51) Int. Cl.
*G10L 17/06* (2013.01)
*G10L 17/02* (2013.01)

(52) U.S. Cl.
CPC .............. *G10L 17/06* (2013.01); *G10L 17/02* (2013.01)

(58) Field of Classification Search
CPC ................................ G10L 17/06; G10L 17/02
See application file for complete search history.

(56) References Cited

U.S. PATENT DOCUMENTS 9,972,323 B2 5/2018 Foerster et al.
11,488,605 B2 11/2022 Khoury et al.
(Continued)

FOREIGN PATENT DOCUMENTS

CN 111798828 A 10/2020
CN 112349267 A 2/2021
(Continued)

OTHER PUBLICATIONS

Clara Borrelli, et al., "Synthetic speech detection through short-term and long-term prediction traces", EURASIP, Journal on Information Security 2021, vol. 2, Apr. 6, 2021, 14 pages, https://doi.org/10.1186/s13635-021-00116-3.
(Continued)

*Primary Examiner* — Sonia L Gay
(74) *Attorney, Agent, or Firm* — Sughrue Mion, PLLC

(57) ABSTRACT

A method of controlling an electronic apparatus for distinguishing original voice from synthetic voice in an Internet of Things (IoT) environment includes obtaining a voice of a user and environmental factors associated with a user-initiated request, extracting a plurality of features from the voice of the user and the environmental factors, obtaining a score using the plurality of features and ranking the score based on a type of the voice of the user and the environmental factors, and determining the voice of the user as the original voice or the synthetic voice by comparing the ranked score with a dynamic threshold value.

20 Claims, 17 Drawing Sheets

(56) References Cited

U.S. PATENT DOCUMENTS

| | | | | |
|---|---|---|---|---|
| 2006/0074667 | A1* | 4/2006 | Saffer | G10L 15/26 704/E15.044 |
| 2006/0085188 | A1* | 4/2006 | Goodwin | G11B 27/28 704/E15.005 |
| 2007/0219801 | A1 | 9/2007 | Sundaram et al. | |
| 2009/0259468 | A1 | 10/2009 | Schroeter | |
| 2014/0081642 | A1 | 3/2014 | Rosen et al. | |
| 2019/0066686 | A1* | 2/2019 | Baracaldo Angel | G10L 21/0208 |
| 2019/0287536 | A1* | 9/2019 | Sharifi | G10L 15/22 |
| 2019/0295553 | A1* | 9/2019 | Jung | G06N 3/045 |
| 2020/0184979 | A1* | 6/2020 | Keret | G10L 25/51 |
| 2022/0059123 | A1 | 2/2022 | Sheaffer et al. | |
| 2022/0139368 | A1* | 5/2022 | Zhang | G10L 15/00 704/200 |
| 2022/0165253 | A1 | 5/2022 | Sharifi et al. | |
| 2022/0165297 | A1 | 5/2022 | Wang et al. | |
| 2022/0189470 | A1* | 6/2022 | Sharifi | G10L 15/08 |
| 2022/0328050 | A1 | 10/2022 | Hennig et al. | |

FOREIGN PATENT DOCUMENTS

| | | | |
|---|---|---|---|
| CN | 112967712 | A | 6/2021 |
| CN | 114420100 | A | 4/2022 |
| CN | 115565538 | A | 1/2023 |
| WO | 2020/231883 | A1 | 11/2020 |
| WO | 2021/042537 | A1 | 3/2021 |
| WO | 2021/179714 | A1 | 9/2021 |
| WO | 2022/222056 | A1 | 10/2022 |
| WO | 2023/083471 | A1 | 5/2023 |

OTHER PUBLICATIONS

International Search Report (PCT/ISA/210) and Written Opinion (PCT/ISA/237) issued by the International Searching Authority on Aug. 19, 2024 in International Application No. PCT/IB2024/054070.

Communication dated Dec. 30, 2025 issued by Intellectual Property India in Indian Patent Application No. 202311041861.

Communication dated Mar. 18, 2026 issued by the European Patent Office in European Patent Application No. 24825405.4.

* cited by examiner

SYSTEM AND METHOD FOR DISTINGUISHING ORIGINAL VOICE FROM SYNTHETIC VOICE IN AN IoT ENVIRONMENT

CROSS-REFERENCE TO RELATED APPLICATIONS

This application is a bypass continuation of International Application No. PCT/IB2024/054070, filed on Apr. 26, 2024, which is based on and claims priority to India Patent Application No. 202311041861, filed on Jun. 23, 2023, in the Intellectual Property India, the disclosures of which are incorporated by reference herein in their entireties.

BACKGROUND

1. Field

The present disclosure relates generally to voice detection, and more particularly, to a system and method for distinguishing an original voice from a synthetic voice in an Internet of Things (IoT) environment.

2. Description of Related Art

The emergence of Internet of Things (IoT) technologies has led to the development of a smart home environment that can be controlled by voice commands. Although such smart home environments provide users with the convenience of controlling devices using their voice, related IoT environments may be open to voice-based spoofing attacks and/or vocal mimicry that may trick users into revealing personal information and/or to gain access to devices present in the smart home environment. For example, in the voice-based spoofing attacks, attackers may use impersonations and/or record-and-replay techniques to fool the users. That is, these voice-based spoofing attacks may involve an attacker mimicking a user's voice and/or playing back a recording of the user's voice in order to gain access to sensitive data and/or resources, which may lead to significant privacy breaches and/or data loss, as well as, potential security risks for users of these systems. As another example, a vocal mimicry artist may steal personal data by faking a user's voice, and thus, making it difficult for a voice assistant (VA) to differentiate the user's voice from the synthetic or mimicked voice in the absence of another identifying input (e.g., an image of the user, a fingerprint of the user, or the like).

Consequently, in order to protect users from potential security risks, it may be desirable to have a system and/or method that may differentiate original users' voices from synthetic voices in an IoT environment.

There may be several measures that may be used to differentiate the original voices from the synthetic voices, which may include, but not be limited to, integrating biometrics (e.g., facial recognition, fingerprint scanning, or the like). However, such measures may be difficult to adopt due to their complexity and associated costs (e.g., additional sensors, degraded user experience, or the like).

In addition, for example, in a scenario where the user may be experiencing vocal difficulty due to physiological reasons, there may be instances where the VA may be unable to recognize the user's voice. In an attempt to mitigate this problem, a sensor may be affixed to the user's throat. However, such an approach may result in usability issues, and accuracy may be compromised while obtaining information from the vocal source. As another example, the presence of environmental acoustic features may interfere with the ability to extract features for user identification. As another example, the user's proximity to the device (e.g., VA, smart speaker, or the like) may affect the accuracy of the user identification.

Thus, there exists a need for further improvements in voice detection technologies, as the need for smart home environments may be constrained by privacy and security risks of IoT environments. Improvements are presented herein. These improvements may also be applicable to other voice biometrics, secure recognition, and identification technologies.

SUMMARY

According to an aspect of the disclosure, a method of controlling an electronic apparatus for distinguishing original voice from synthetic voice in an Internet of Things (IoT) environment includes obtaining a voice of a user and environmental factors associated with a user-initiated request, extracting a plurality of features from the voice of the user and the environmental factors, obtaining a score using the plurality of features and ranking the score based on a type of the voice of the user and the environmental factors, and determining the voice of the user as the original voice or the synthetic voice by comparing the ranked score with a dynamic threshold value.

The determining the voice of the user as the original voice of the synthetic voice may include determining the voice of the user as the original voice based on the ranked score being above the dynamic threshold value, and determining the voice of the user as the synthetic voice based on the ranked score being below the dynamic threshold value.

The method may include performing re-verification of the voice of the user based on the ranked score being equal to the dynamic threshold value. The performing of the re-verification may include performing a search in a combined database for phrases of spatial features and temporal features that are similar to spatial features and temporal features of the voice of the user and the environmental factors, selecting, from among the searched phrases, a phrase of least variation for an environment, simulating environmental factors of the environment of the selected phrase using multiple IoT devices, prompting the user to speak the selected phrase for re-verification of the voice of the user, counting a number of times the re-verification of the voice of the user is performed, and stopping the re-verification based on the number of times reaching a predefined count value.

The method may include processing the user-initiated request including the voice of the user and the environmental factors, extracting the plurality of features from the processed voice of the user and the environmental factors, mapping the plurality of features to features stored in a speaker database, identifying, based on the mapping, the user that initiated the user-initiated request, separating each channel of the voice of the user and the environmental factors, and generating a first output including a first channel of the voice of the user and a second output including a combination of each channel of the environmental factors.

The plurality of features may include spatial features and temporal features of the voice of the user and the environmental factors. In some embodiments, the extracting of the plurality of features may include separately preprocessing the voice of the user and the environmental factors, wherein the preprocessing may include performing normalization, pre-emphasis, and frame blocking, extracting the plurality of features from the preprocessed voice of the user and the preprocessed environmental factors based on at least one of frequency, energy, zero crossing rate, or Mel-frequency cepstral coefficients (MFCC), and segregating the plurality of features of the voice of the user and the environmental factors by performing feature separation and dimension reduction.

The extracting the plurality of features from the preprocessed voice of the user and the preprocessed environmental factors may include performing continuous wavelet transformation of the preprocessed voice of the user and the preprocessed environmental factors and generating a scalogram that visualizes the transformation, extracting the plurality of features including at least one of periodic changes, aperiodic changes, or temporal changes, and separately performing the segregating of the plurality of features.

The obtaining the score may include preprocessing the plurality of features, searching one or more properties of each of the plurality of features, determining an upper specification limit and a lower specification limit of each of the plurality of features, determining a first type of the voice of the user, the first type including at least one of a regular voice or an irregular voice, determining a second type of the environmental factors based on at least one of past patterns or user history stored in a combined database, the second type including at least one of known environmental factors or unknown environmental factors, selecting a kernel, extracting the plurality of features of the voice of the user and the environmental factors based on the kernel, and computing the score using an optimized plurality of features, and ranking the score based on the first type of the voice of the user and the second type of the environmental factors, wherein the optimized plurality of features may include a portion of the plurality of features optimized using a regression function.

The selecting the kernel may include selecting the kernel from a plurality of kernels by comparing combined feature vectors of each kernel of the plurality of kernels using a cost function and selecting the kernel having a minimum distance based on the cost function.

The plurality of features of the voice of the user may include at least one of spatial features of the voice of the user or temporal features of the voice of the user. The spatial features of the voice of the user may include at least one of a fundamental frequency, a formant frequency, a speech variability, an amplitude, or a falling amplitude. The temporal features of the voice of the user may include at least one of a pause duration, a maximum pause duration, a minimum pause duration, or a zero crossing rate.

The plurality of features of the environmental factors may include at least one of spatial features of the environmental factors or temporal features of the environmental factors. The spatial features of the environmental factors may include at least one of a spectral band energy, a spectral flux, a spectral maxima, a raising amplitude, or a falling amplitude. The temporal features of the environmental factors may include at least one of a pause duration, a maximum pause duration, a minimum pause duration, a periodicity, or an aperiodicity.

The determining the voice of the user as the original voice or the synthetic voice may include performing threshold verification of the ranked score, determining the dynamic threshold value based on spatial features and temporal features of the voice of the user and the environmental factors stored in a combined database, re-performing ranking based on the dynamic threshold value, determining that the voice of the user is the original voice based on the ranked score being above the dynamic threshold value, and determining that the voice of the user is the synthetic voice based on the ranked score being below the dynamic threshold value.

According to an aspect of the disclosure, an electronic apparatus for distinguishing original voice from synthetic voice in an IoT environment includes a memory storing instructions, and one or more processors communicatively coupled to the memory. The one or more processors are configured to execute the instructions to obtain a voice of a user and environmental factors associated with a user-initiated request, extract a plurality of features from the voice of the user and the environmental factors, obtain a score using the plurality of features and ranking the score based on a type of the voice of the user and the environmental factors, and determine the voice of the user as the original voice or the synthetic voice by comparing the ranked score with a dynamic threshold value.

The one or more processors are further configured to execute further instructions to determine the voice of the user as the original voice based on the ranked score being above the dynamic threshold value, and determine the voice of the user as the synthetic voice based on the ranked score being below the dynamic threshold value.

The one or more processors are further configured to execute further instructions to perform re-verification of the voice of the user based on the ranked score being equal to the dynamic threshold value. In some embodiments, to perform the re-verification of the voice of the user may include to perform a search in a combined database for phrases of spatial features and temporal features that are similar to spatial features and temporal features of the voice of the user and the environmental factors, select, from among the searched phrases, a phrase of least variation for an environment, simulate environmental factors of the environment of the selected phrase using multiple IoT devices, prompt the user to speak the selected phrase for re-verification of the voice of the user, count a number of times the re-verification of the voice of the user is performed, and stop the re-verification based on the number of times reaching a predefined count value.

The one or more processors are further configured to execute further instructions to process the user-initiated request including the voice of the user and the environmental factors, extract the plurality of features from the processed voice of the user and the processed environmental factors, map the plurality of features to features stored in a speaker database, identify, based on the map, the user that initiated the user-initiated request, separate each channel of the voice of the user and the environmental factors, and generate including a first output including a first channel of the voice of the user and a second output including a combination of each channel of the environmental factors.

The plurality of features may include spatial features and temporal features of the voice of the user and the environmental factors. In some embodiments, the one or more processors are further configured to execute further instructions to separately preprocess the voice of the user and the environmental factors, wherein the preprocessing includes performing normalization, pre-emphasis, and frame blocking, extract the plurality of features from the preprocessed voice of the user and the preprocessed environmental factors based on at least one of frequency, energy, zero crossing rate, or MFCC, and segregate the plurality of features of the voice of the user and the environmental factors by performing feature separation and dimension reduction.

The one or more processors are further configured to execute further instructions to perform continuous wavelet transformation of the preprocessed voice of the user and the preprocessed environmental factors and generating a scalogram that visualizes the transformation, extract the plurality of features including at least one of periodic changes, aperiodic changes, or temporal changes, and separately perform the segregating of the plurality of features.

The one or more processors are further configured to execute further instructions to preprocess the plurality of features, search one or more properties of each of the plurality of features, determine an upper specification limit and a lower specification limit of each of the plurality of features, determine a first type of the voice of the user, the first type including at least one of a regular voice or an irregular voice, determine a second type of the environmental factors based on at least one of past patterns or user history stored in a combined database, the second type including at least one of known environmental factors or unknown environmental factors, select a kernel, extract the plurality of features of the voice of the user and the environmental factors based on the kernel, and compute the score using an optimized plurality of features, and rank the score based on the first type of the voice of the user and the second type of the environmental factors, wherein the optimized plurality of features include a portion of the plurality of features optimized using a regression function.

The one or more processors are further configured to execute further instructions to select the kernel from a plurality of kernels by comparing combined feature vectors of each kernel of the plurality of kernels using a cost function and selecting the kernel having a minimum distance based on the cost function.

The one or more processors are further configured to execute further instructions to perform threshold verification of the ranked score, determine the dynamic threshold value based on spatial features and temporal features of the voice of the user and the environmental factors stored in a combined database, re-perform ranking based on the dynamic threshold value, determine that the voice of the user is the original voice based on the ranked score being above the dynamic threshold value, and determine that the voice of the user is the synthetic voice based on the ranked score being below the dynamic threshold value.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
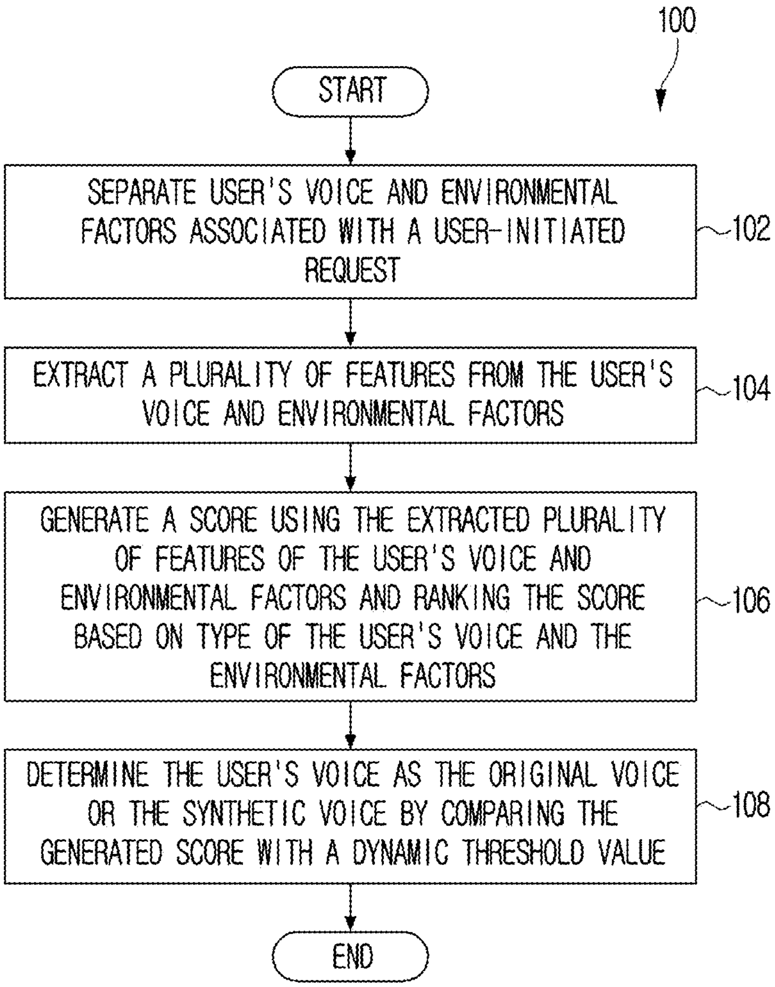
FIG. 1 depicts a flow diagram showing a method for distinguishing original voice from synthetic voice in an Internet of Things (IoT) environment, according to one or more embodiments.

In the following description, numerous specific details are set forth in order to provide a thorough understanding of the present disclosure. It will be apparent, however, to one skilled in the art that these specific details are only exemplary and not intended to be limiting. Additionally, it may be noted that the systems and/or methods are shown in block diagram form only in order to avoid obscuring the present disclosure. It is to be understood that various omissions and substitutions of equivalents may be made as circumstances may suggest or render expedient to cover various applications or implementations without departing from the spirit or the scope of the present disclosure. Further, it is to be understood that the phraseology and terminology employed herein are for the purpose of clarity of the description and should not be regarded as limiting.

Furthermore, in the present description, references to "one embodiment," "one or more embodiments" or "an embodiment" means that a particular feature, structure, or characteristic described in connection with the embodiment is included in at least one embodiment of the present disclosure. The appearance of the phrase "in one embodiment" in various places in the specification is not necessarily referring to the same embodiment, nor are separate or alternative embodiments mutually exclusive of other embodiments. Further, the terms "a" and "an" used herein do not denote a limitation of quantity, but rather denote the presence of at least one of the referenced items. Moreover, various features are described which may be exhibited by some embodiments and not by others. Similarly, various requirements are described, which may be requirements for some embodiments but not for other embodiments.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

It is to be understood that the number and/or arrangement of components, modules, or the like depicted in the drawings are provided as an example. In practice, there may be additional components, fewer components, different components, or differently arranged components than those shown in drawings. Furthermore, two or more components may be implemented within a single component, or a single component may be implemented as multiple, distributed components. Alternatively or additionally, a set of (one or more) components may be integrated with each other, and/or may be implemented as an integrated circuit, as software, and/or a combination of circuits and software.

Hereinafter, various embodiments of the present disclosure are described with reference to the accompanying drawings.

Referring to FIG. 1, a flow diagram showing a method 100 for distinguishing an original voice from a synthetic voice in an Internet of Things (IoT) environment is depicted, according to an embodiment. The ability to distinguish between original and synthetic voices in an IoT environment may be increasing in importance. For example, as the number of connected devices may be growing, the potential for malicious users to use artificial or synthetic voices to manipulate data and gain access to sensitive information may be similarly growing. To potentially protect against these threats, voice detection technology may be able to accurately identify whether a given input is from a genuine (original) source or a voice that has been created artificially.

The method 100 for distinguishing the original voice from the synthetic voice in an IoT environment is described in conjunction with a system described with reference to FIG. 2. In the flow diagram of method 100 in FIG. 1, each block may represent a module, segment, or portion of code, which may include one or more executable instructions for implementing the specified logical functions. In some embodiments, the functions noted in the blocks may occur out of the order noted in the drawings. For example, two blocks shown in succession in FIG. 1 may be executed substantially concurrently or the blocks may sometimes be executed in the reverse order, depending upon the functionality involved. Any process descriptions or blocks in flowcharts may be understood as representing modules, segments, or portions of code that may include one or more executable instructions for implementing specific logical functions or operations in the process, and alternate implementations are included within the scope of the example embodiments in which functions may be executed out of order from that shown or discussed, including substantially concurrently or in reverse order, depending on the functionality involved. In addition, the process descriptions or blocks in flow charts may be understood as representing decisions made by a hardware structure such as a state machine. The flow diagram starts at operation 102 and proceeds to operation 108.

At operation 102, user's voice and/or environmental factors associated with a user-initiated request may be separated. In one embodiment, the environmental factors may include background noise from sounds of indoor sources, such as, but not limited to, water installations, heating/cooling, service installations, other people talking nearby, or the like, and/or from outdoor sources, such as, but not limited to, traffic, construction, neighborhood activities, weather, or the like. In an embodiment, the environmental factors may include, but not be limited to, sound of clock ticking, sound of fan, traffic sounds, or the like.

A plurality of features may be extracted, at operation 104, from the user's voice and environmental factors. In one embodiment, the plurality of features may include spatial and/or temporal features of the user's voice and/or the environmental factors. The spatial features may refer to how sound waves travel through space, which may include features such as, but not limited to, intensity, frequency range, directionality, or focus points in an environment where sound is detected from multiple sources. The temporal features may be related to time-based aspects such as, but not limited to, duration or timing between words in the user-initiated request that may be used to identify different speakers within a given area based on their distinct patterns over time.

At operation 106, a score may be generated and the generated score may be ranked. In one embodiment, the score may be generated using the extracted plurality of features of the user's voice and environmental factors and the score may be ranked based on the type of the user's voice and the environmental factors. The type of the user's voice may include, but not be limited to, regular voice and irregular voice based on past patterns or user history stored in a combined database. In an embodiment, the regular voice type may refer to the typical and/or normal voice of the user. Alternatively or additionally, the irregular voice type may refer to voice patterns that exhibit changed voice quality, pitch breaks, or other anomalies that may be attributed to changes in vocal cord behavior. In some embodiments, the irregular voice may be indicative of specific vocal cord disorders such as, but not limited to, nodules, polyps, cysts, or the like. Further, the type of the environmental factors may include, but not be limited to, known environmental factors and/or unknown environmental factors based on the past patterns or user history stored in the combined database. In an embodiment, the known environmental factors may include, but not be limited to, environmental acoustics that may exist in a room at the same time on different days. Alternatively or additionally, the unknown environmental factors may encompass acoustics that may be new and/or different, and/or originating for the first time.

The user's voice may be determined, at operation 108, as the original voice or the synthetic voice by comparing the generated (and ranked) score with a dynamic threshold value. In one embodiment, the user's voice may be determined as the original voice if the generated (and ranked) score is above the dynamic threshold value and/or as the synthetic voice if the generated (and ranked) score is below the dynamic threshold value.

Figure 2:
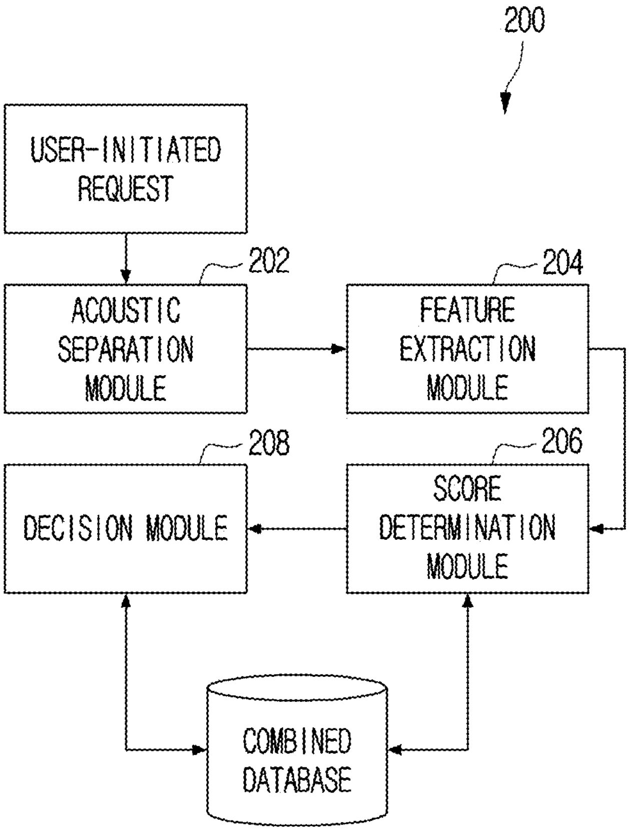
FIG. 2 depicts a block diagram of the system performing method for distinguishing original voice from synthetic voice in an IoT environment, according to one or more embodiments.

Referring to FIG. 2, a block diagram for distinguishing the original voice from the synthetic voice in the IoT environment is depicted, according to one or more embodiments. The system 200 may include an acoustic separation module 202, which may be configured to separate user's voice and environmental factors associated with the user-initiated request, and is described with reference to FIGS. 3 and 4. In one embodiment, the acoustic separation module 202 may separate the user's voice from the environmental factors to enable the system 200 to distinguish the original voice from the synthetic voice and to understand and interpret the user-initiated request, which may result in relatively more accurate responses, when compared with related voice detection devices.

Figure 3:
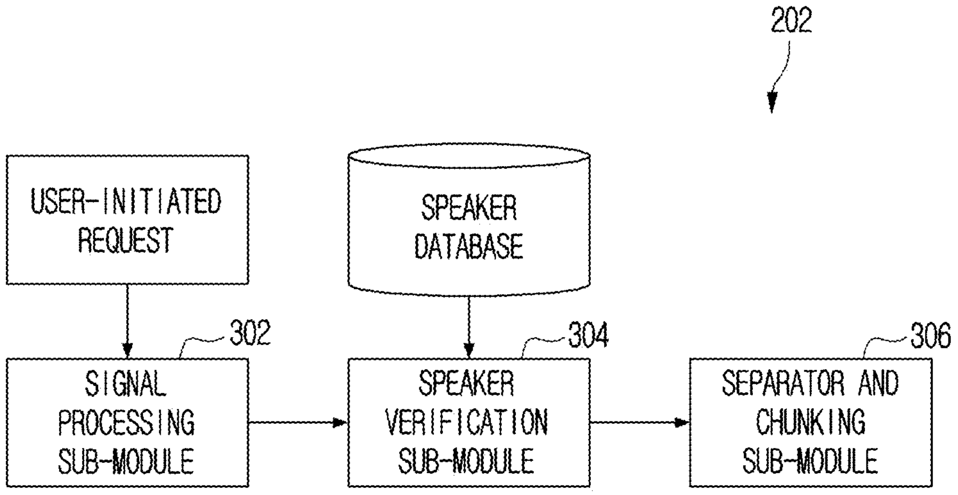
FIG. 3 depicts a block diagram of an acoustic separation module, according to one or more embodiments.

Referring to FIG. 3, a block diagram of the acoustic separation module 202 is depicted, according to an embodiment. In order to perform the separation of the user's voice and the environmental factors associated with the user-initiated request, the acoustic separation module 202 may include a signal processing sub-module 302.

The signal processing sub-module 302 may be configured to process the user-initiated request, which may include encoding of the user-initiated request and separating the user's voice and environmental factors associated with the user-initiated request. In an embodiment, the signal processing sub-module 302 may perform a series of operations on the user-initiated request, including, but not limited to, Fast Fourier Transform (FFT), log-amplitude spectrum, Mel scaling, discrete cosine transform (DCT), or the like.

In an embodiment, the user-initiated request may be and/or may include an audio signal and the FFT performed by the signal processing sub-module 302 may be used to analyze the audio signal by converting the audio signal from the time domain into the frequency domain. For example, the conversion of the audio signal may allow for the identification of different frequency components that may be present in the audio signal. In order to apply the FFT to the audio signal, the audio data may be transformed from an analog signal to a digital format. For example, the FFT algorithm may be applied to digital audio data to obtain a frequency analysis of the audio signal. The signal processing sub-module 302 may use at least one FFT algorithm from among known FFT algorithms such as, but not limited to, Cooley-Tukey algorithm, Bluestein algorithm, the Winograd Fourier transform algorithm, or the like, to perform the FFT of the audio signal.

In an embodiment, the log-amplitude spectrum may be performed by calculating a logarithm of the magnitude spectrum of the Fourier transform of the audio signal. The log-amplitude spectrum may be used in the audio signal processing to represent a frequency content of the signal.

In an embodiment, the Mel scaling may refer to a process of mapping the frequency spectrum of an audio signal to a Mel scale, which may be based on perception of sound by a human ear. That is, the Mel scale may be based on a non-linear transformation of frequency, which may reflect the manner in which the human ear may perceive different frequencies. In an embodiment, the Mel scaling may be performed to provide a relatively more accurate representation of the frequency content of the audio signal.

The Mel scaling may be used in audio signal processing applications, and may be combined with other techniques, such as Fourier transforms, to enable effective analysis and manipulation of the audio signals.

In an embodiment, the DCT may be performed to convert a time-domain representation of the audio signal into the frequency-domain representation. Similarly to other types of Fourier transforms, the DCT may provide for the identification of the different frequency components present in the audio signal.

The acoustic separation module 202 may further include a speaker verification sub-module 304, which may be configured to extract features from the processed user's voice and environmental factors and may be further configured to map the extracted features with features stored in a speaker database. In an embodiment, the mapping may be used to determine (e.g., identify) the user which initiated the request.

In addition, the acoustic separation module 202 may include a separator and chunking sub-module 306 that may be configured to separate each channel of the user's voice and environmental factors and to combine each channel of the environmental factors together to generate two outputs, including one for the user's voice and another for the environmental factors. In one embodiment, the acoustic separation module 202 may perform encoding of the received user's voice and environmental factors, separating each channel of the user's voice and environmental factors and then decoding. That is, the acoustic separation module 202 may perform a meaningful separation of channels for the user's voice and environmental factors. For example, when the user initiates a request that includes a combination of the user's voice and environmental factors (e.g., ambient noise from a fan, street traffic, or outdoor activities), the acoustic separation module 202 may process the received request and may separate each channel of the user's voice and every environmental factor using the separator and chunking sub-module 306 and may provide two channels at the output.

Figure 4:
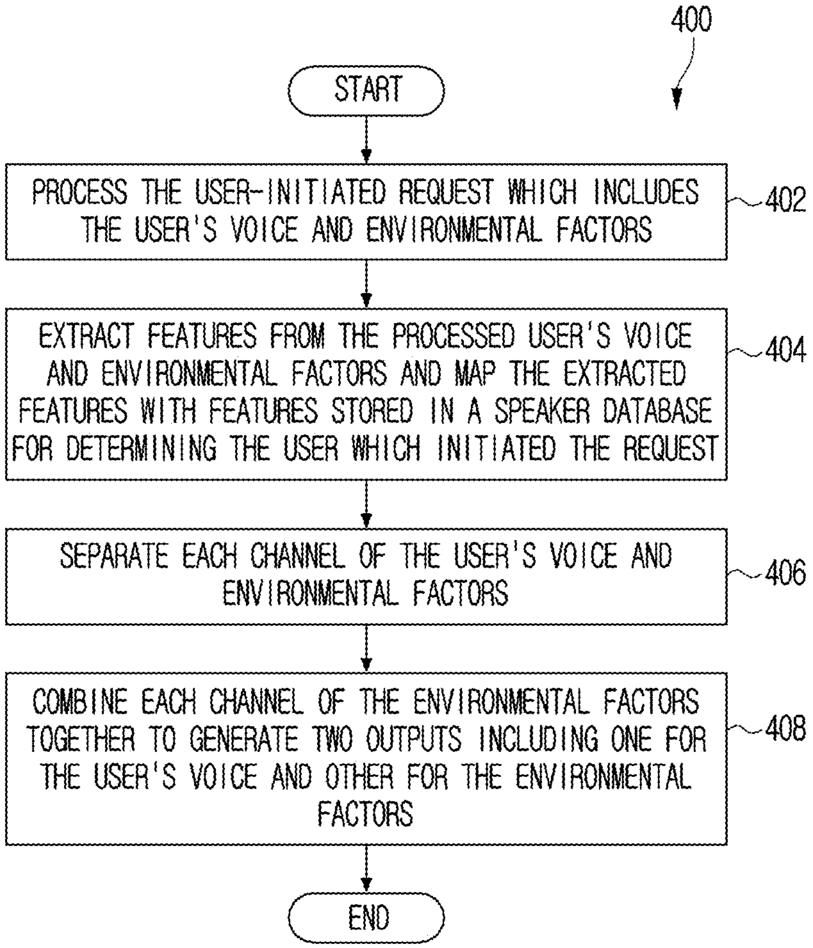
FIG. 4 depicts a flow diagram showing a method of the acoustic separation module, according to one or more embodiments.

Referring to FIG. 4, a flow diagram showing a method 400 of the acoustic separation module is depicted, according to an embodiment. The user-initiated request may be processed at operation 402. In one embodiment, the user-initiated request may include the user's voice and environmental factors.

At operation 404, features may be extracted from the processed user's voice and environmental factors and the extracted features may be mapped with features stored in a speaker database for determining the user that initiated the request. Each channel of the user's voice and the environmental factors may be separated, at operation 406.

At operation 408, each channel of the environmental factors may be combined together to generate two outputs including one for the user's voice and another for the environmental factors.

Returning to FIG. 2, the system 200 may further include a feature extraction module 204. The feature extraction module 204 may be configured to extract a plurality of features from the user's voice and environmental factors, as described with reference to FIG. 5, FIG. 6, and FIG. 7. In one embodiment, the plurality of features may include spatial features and temporal features of the user's voice and the environmental factors.

Figure 5:
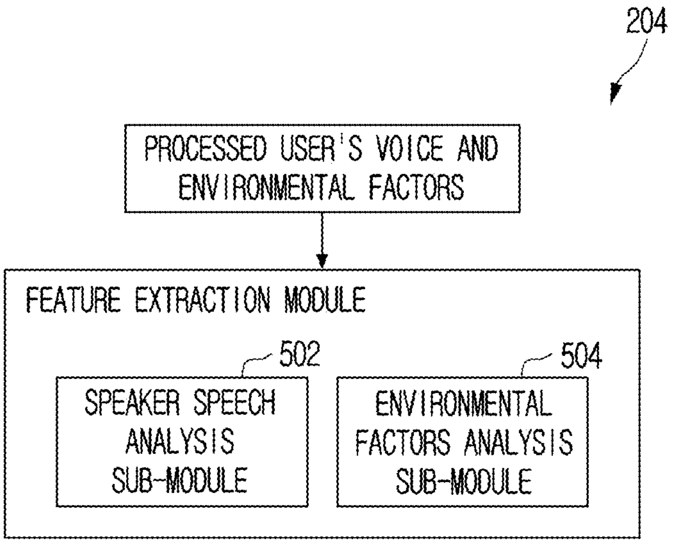
FIG. 5 depicts a block diagram of feature extraction module, according to one or more embodiments.

Referring to FIG. 5, a block diagram of the feature extraction module 204 is depicted, according to one or more embodiments.

The feature extraction module 204 may include a speaker speech analysis sub-module 502 and an environmental factors analysis sub-module 504 that may be respectively configured to perform extraction of the spatial and temporal features of the user's voice and the environmental factors.

In one embodiment, the speaker speech analysis sub-module 502 may perform preprocessing, feature extraction, and feature segregation of the user's voice to extract the spatial features of the user's voice. The preprocessing may include, but not be limited to, performing normalization, pre-emphasis, and frame blocking to potentially improve the quality of the user's voice and to facilitate further processing. The feature extraction may then be performed on the preprocessed user's voice based on at least one of frequency, energy, zero crossing rate, Mel-frequency cepstral coefficients (MFCC), or the like. In one embodiment, the MFCCs may be extracted by performing operations that may include, but not be limited to, performing an FFT, applying Mel scale filtering, generating the logarithm of the filter outputs, or the like, and subsequently applying a DCT and deriving derivatives from the resulting coefficients.

In an embodiment, the extracted features may be segregated by performing feature separation and dimension reduction.

The speaker speech analysis sub-module 502 may further perform preprocessing, continuous wavelet transformation, feature extraction, and feature segregation of the extracted features of the user's voice to extract the temporal features of the user's voice. The preprocessing may include, but not be limited to, performing normalization, pre-emphasis, and frame blocking to potentially improve the quality of the user's voice and to facilitate further processing. The continuous wavelet transformation may be performed on the preprocessed user's voice and a scalogram may be generated to visualize the transformation.

In one embodiment, the continuous wavelet transformation may be performed in operations that may include, but not be limited to, pre-processing the user's voice using a Morlet continuous wavelet transform, followed by normalisation. The resulting output may be fed to a feature learning layer, which may receive input from layers such as, but not limited to, a convolution layer, a max pooling layer, and a rectified linear unit (ReLU) function. The outputs from the feature learning layer may be provided to a classification layer, which may also receive inputs from layers such as, but not limited to, a soft-max layer, a flatten layer, and a fully connected layer, and may display the output.

In an embodiment, the features (e.g., periodicity, aperiodicity, temporal changes) may be extracted from the user's voice and may be segregated.

In one embodiment, the environmental factors analysis sub-module 504 may perform preprocessing, feature extraction, and feature segregation of the environmental factors to extract the spatial features of the environmental factors. The preprocessing may include, but not be limited to, performing normalization, pre-emphasis, and frame blocking to potentially improve the quality of the environmental factors and to facilitate further processing. The feature extraction may performed on the preprocessed environmental factors based on at least one of frequency, energy, zero crossing rate, MFCC, or the like. In one embodiment, the MFCCs may be extracted by performing operations that may include, but not be limited to, performing an FFT, applying Mel scale filtering and generating the logarithm of the filter outputs, or the like, and subsequently applying a DCT and deriving derivatives from the resulting coefficients.

In an embodiment, the extracted features may be segregated by performing feature separation and/or dimension reduction.

The environmental factors analysis sub-module 504 may further perform preprocessing, continuous wavelet transformation, feature extraction, and segregation of extracted features of the environmental factors. The preprocessing may include performing normalization, pre-emphasis, and frame blocking to potentially improve the quality of the user's voice and to facilitate further processing. The continuous wavelet transformation may be performed on the preprocessed environmental factors and a scalogram may be generated to visualize the transformation.

In one embodiment, the continuous wavelet transformation may be performed by performing operations that may include pre-processing the environmental factors using a Morlet continuous wavelet transform, followed by normalisation. The resulting output may be fed to a feature learning layer, which may receive input from layers such as, but not limited to, a convolution layer, a max pooling layer, and a ReLU function. The outputs from the feature learning layer may be provided to a classification layer, which may also receive inputs from layers such as, but not limited to, a soft-max layer, a flatten layer, a fully connected layer, or the like, and may display output.

In an embodiment, the features (e.g., periodicity, aperiodicity, temporal changes) may be extracted from the environmental factors and may be segregated.

Figure 6:
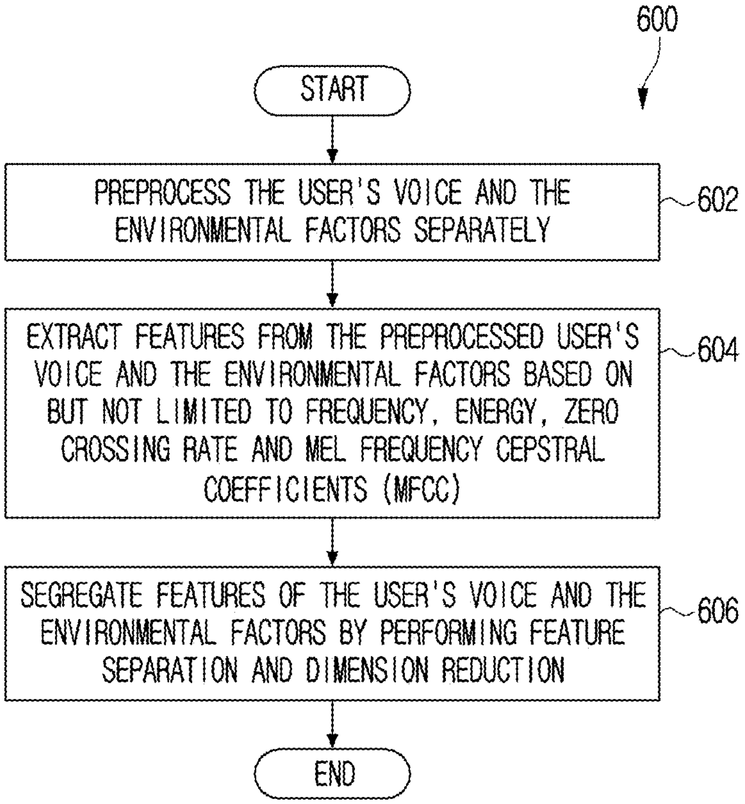
FIG. 6 depicts a flow diagram showing a method of extracting spatial features of user's voice and the environmental factors, according to one or more embodiments.

Referring to FIG. 6, a flow diagram showing a method 600 of extracting spatial features of user's voice and the environmental factors is depicted, according to an embodiment. The user's voice and the environmental factors may be separately processed at operation 602. In one embodiment, the preprocessing may include performing at least one of normalization, pre-emphasis, or frame blocking.

At operation 604, features may be extracted from the preprocessed user's voice and the environmental factors, based on at least one of frequency, energy, zero crossing rate, MFCC, or the like. Features of the user's voice and the environmental factors may be segregated, at operation 606, by performing feature separation and dimension reduction.

Figure 7:
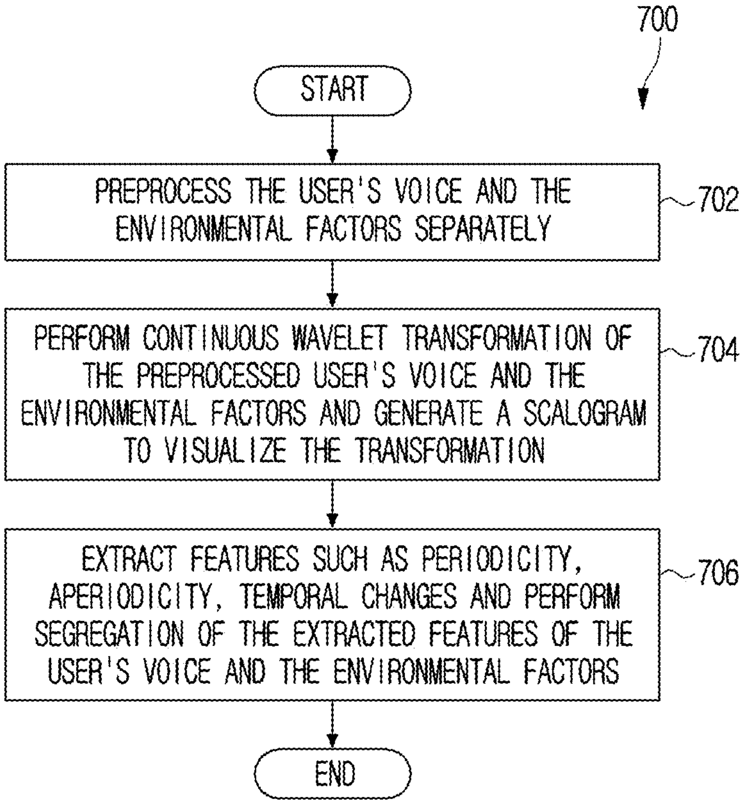
FIG. 7 depicts a flow diagram showing a method of extracting the temporal features of the user's voice and the environmental factors, according to one or more embodiments.

Referring to FIG. 7, a flow diagram showing a method 700 of extracting temporal features of user's voice and the environmental factors is depicted, according to an embodiment. The user's voice and the environmental factors may be separately processed at operation 702. In one embodiment, the preprocessing may include performing at least one of normalization, pre-emphasis, frame blocking, or the like.

At operation 704, continuous wavelet transformation of the preprocessed user's voice and the environmental factors may be performed and a scalogram may be generated to visualize the transformation. Features of the user's voice and the environmental factors may be extracted and segregated at operation 706. In one embodiment, the features may include, but not be limited to, periodicity, aperiodicity, or temporal changes.

Returning to FIG. 2, the system 200 may further include a score determination module 206. The score determination module 206 may be configured to generate a score for the extracted plurality of features of the user's voice and environmental factors and to rank the score based on a type of the user's voice and the environmental factors, as described with reference to FIGS. 8 and 9.

Figure 8:
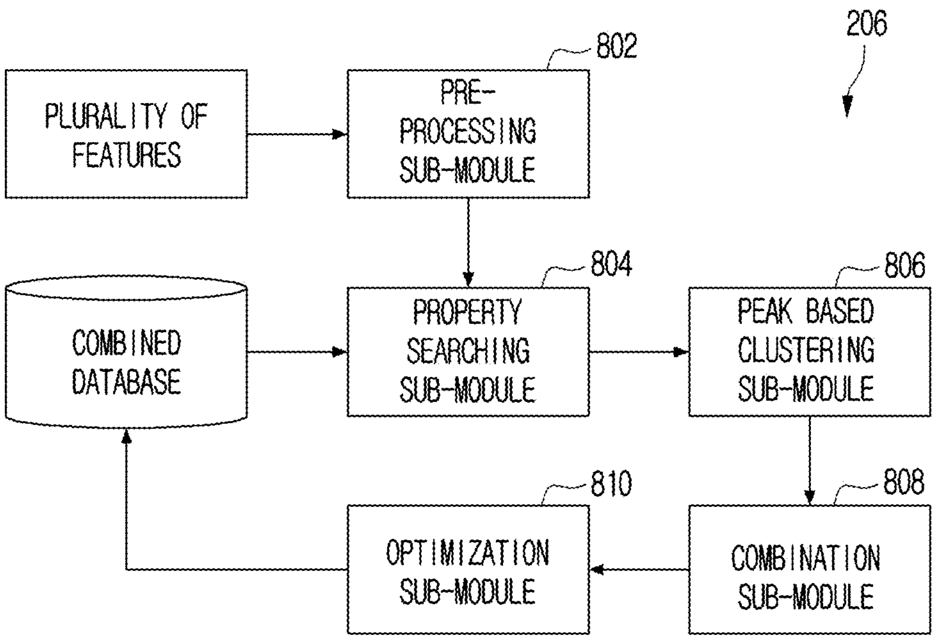
FIG. 8 depicts a block diagram of a score determination module, according to one or more embodiments.

Referring to FIG. 8, a block diagram of the score determination module 206 is depicted, according to one or more embodiments.

The score determination module 206 may include a pre-processing sub-module 802 that may be configured to preprocess a plurality of features of the user's voice and environmental factors extracted by the feature extraction module 204.

The score determination module 206 may further include a property searching sub-module 804 that may be configured to perform a search of one or more properties of each of the plurality of features. The score determination module 206 may further include a peak based clustering sub-module 806 that may be configured to determine an upper specification limit and/or a lower specification limit of each of the plurality of features and a combination sub-module 808 that may be configured to perform multiple functions including, but not limited to, determining a type of the user's voice, which may include, but not be limited to, a regular voice or an irregular voice, determining a type of the environmental factors, which may include, but not be limited to, known environmental factors or unknown environmental factors, based on past patterns and/or user history stored in the combined database, selecting an appropriate kernel, and extracting plurality of features of the user's voice and environmental factors with respect to the selected kernel.

In one embodiment, the appropriate kernel may be selected from a plurality of kernels by comparing combined feature vectors of each kernel with a cost function and by selecting the kernel having the least distance (e.g., a smallest distance) based on the cost function.

The plurality of features of the user's voice may include spatial features of the user's voice such as, but not limited to, fundamental frequency, formant frequency, speech variability, amplitude, falling amplitude, or the like. The plurality of features of the user's voice may include temporal features of the user's voice such as, but not limited to, pause duration, maximum pause duration, minimum pause duration, zero crossing rate, or the like.

The plurality of features of the environmental factors may include spatial features of the environmental factors such as, but not limited to, spectral band energy, spectral flux, spectral maxima, raising amplitude, falling amplitude, or the like. The plurality of features of the environmental factors may include temporal features of the environmental factors such as pause duration, maximum pause duration, minimum pause duration, periodicity, aperiodicity, or the like.

The score determination module 206 may include an optimization sub-module 810 that may be configured to compute the score using optimized plurality of features, and to rank the score based on the determined type of the user's voice and the environmental factors, wherein the plurality of features are optimized using a regression function.

Figure 9:
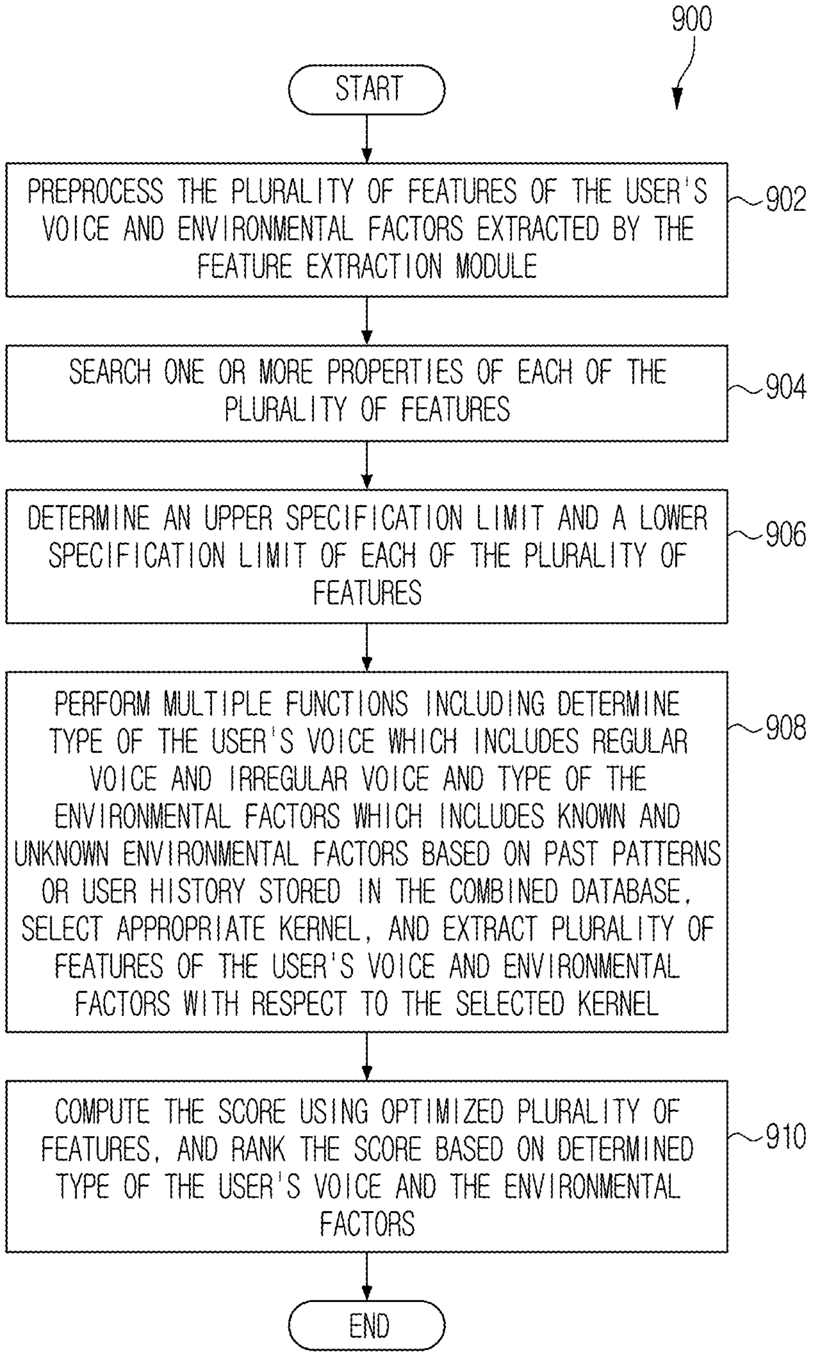
FIG. 9 depicts a flow diagram showing a method of generating a score by the score determination module, according to one or more embodiments.

Referring to FIG. 9, a flow diagram showing a method 900 of generating a score by the score determination module 206 is depicted, according to an embodiment.

At operation 902, the plurality of features of the user's voice and environmental factors extracted may be preprocessed. One or more properties of each of the plurality of features may be searched, at operation 904. At operation 906, an upper specification limit and a lower specification limit of each of the plurality of features may be determined. At operation 908, multiple functions may be performed, which may include at least one of determining a type of the user's voice (e.g., a regular voice, an irregular voice) and a type of the environmental factors (e.g., known environmental factors, unknown environmental factors) based on past patterns and/or user history stored in the combined database, selecting an appropriate kernel, and extracting a plurality of features of the user's voice and environmental factors with respect to the selected kernel.

In an embodiment, the plurality of features may include a feature matrix F having spatial features $S_f$ and temporal features $T_f$, as represented in Equation 1.

$$F = f(S_f, T_f) = [y_{ij}], \text{ where } i = \{0, 1, \ldots, n\} \text{ and } j = \{0, 1, \ldots, m\} \quad \text{Eq. 1}$$

Referring to Equation 1, m and n may be positive integers greater than one (1).

In an embodiment, the kernel may be selected from the feature matrix F using a kernel function $K=\langle y_{ij}\rangle$.

For example, the kernel function K may be used to transform a non-linear decision surface to a linear equation in a higher number of dimension spaces.

In an embodiment, a linear kernel may be selected using a formula that may be represented as an equation similar to Equation 2.

$$K(x, y) = x^T \cdot y \quad \text{Eq. 2}$$

In an embodiment, a polynomial kernel may be selected using a formula that may be represented as an equation similar to Equation 3.

$$K(x, y) = (x^T \cdot y)^p \text{ or } K(x, y) = (x^T \cdot y + 1)^p \quad \text{Eq. 3}$$

Referring to Equation 3, p may represent a polynomial degree.

In an embodiment, the argument of the minimum value of kernel function K may be computed for each kernel (e.g., i=0, 1, . . . n), which may be represented as an equation similar to Equation 4.

$$\text{argmin } (K_i(S_f, T_f)) \quad \text{Eq. 4}$$

-continued $$\underset{x}{\operatorname{argmin}}\ f(x) = \left\{x \mid f(x) = \min_{x'} f(x')\right\}$$

$$\min_{x} f(x) = \{f(x) \mid f(x) < f(x_0)\ \forall\ x_0 \in \mathcal{R}\}$$

Each argument of the minimum value of kernel function K may be compared with a cost function C, which may be represented as an equation similar to Equation 5.

$$C(S_f, T_f) = \frac{|S_f \cap T_f|}{|S_f \cup T_f|} \times c \quad \text{Eq. 5}$$

Referring to Equation 5, $S_f$ may represent spatial features, $T_f$ may represent temporal features, and c may represent a bias coefficient that may be constantly evaluated based on optimization.

The score may be computed using an optimized plurality of features and the computed score may be ranked based on determined type of the user's voice and the environmental factors, at operation 910. In one embodiment, the plurality of features may be optimized using a regression function.

In an embodiment, the regression function Y for the extracted feature matrix may be represented as an equation similar to Equation 6.

$$Y = \beta_0 + \beta_1 Ef_{Sf} + \beta_2 Ef_{Tf} + \beta_3 U_{Sf} + \beta_4 U_{Tf} \quad \text{Eq. 6}$$

Referring to Equation 6, $\beta_0$ represents a Y intercept and may be a constant term, $\beta_1$, $\beta_2$, $\beta_3$, and $\beta_4$ represent slope coefficients, $Ef_{Sf}$ represents spatial features of the environmental factor, $Ef_{Tf}$ represents temporal features of environmental factor, $U_{Sf}$ represents spatial features of the user's voice, and $U_{Tf}$ represents temporal features of the user's voice.

In an embodiment, U may represent the user's voice and may be equal to the spatial features of the user's voice $U_{Sf}$ and the temporal features of the user's voice $U_{Tf}$ (e.g., $U=U_{Sf}+U_{Tf}$), and Ef may represent the environmental features and may be equal to the spatial features of the environmental factors $Ef_{Sf}$ and the temporal features of the environmental factors $Ef_{Tf}$ (e.g., $Ef=Ef_{Sf}+Ef_{Tf}$).

In some embodiments, another user's voice may be present. In such embodiments, the voice of the other users may be represented by $$\sum U'_{S_f} \text{ and } \sum U'_{T_f}.$$

In an embodiment, the regression function Y may be optimized using ¿, which may represent a residual or model error, and the score may be computed using an equation similar to Equation 7.

$$S_c = \frac{a \times S_t + b \times S_s}{a + b} \quad \text{Eq. 7}$$

Referring to Equation 7, a and b are positive constants (e.g., a>0 and b>0), a is greater than b (e.g., a>b), and a and b are used for determination of weightage for authentication of the user's voice.

In an embodiment, the maximum weightage may be assigned to the temporal feature considering consistency of the temporal features of the environmental factor and dependency of the user's voice on the environmental factor.

$$S_T = \frac{U_{Tf}}{Ef_{Tf}} \quad \text{Eq. 8}$$

Referring to Equation 8, $U_{Tf}$ and $Ef_{Tf}$ may be selected in such a way that a standard deviation of the temporal feature of the user's voice $\sigma U_{Tf}$ and a standard deviation of the temporal feature of the environmental factor $\sigma Ef_{Tf}$ may be minimized.

$$S_s = \frac{U_{Sf}}{Ef_{Sf}} \quad \text{Eq. 9}$$

Referring to Equation 9, $U_{Sf}$ and $Ef_{Sf}$ may be selected in such a way that a standard deviation of the spatial feature of the user's voice $\sigma U_{Sf}$ and a standard deviation of the spatial feature of the environmental factor $\sigma Ef_{sf}$ may be minimized.

Returning to FIG. 2, the system 200 may further include a decision module 208. The decision module 208 may be configured to determine the user's voice as the original voice or the synthetic voice by comparing the generated score with a dynamic threshold value, as described with reference to FIGS. 10 and 11.

Figure 10:
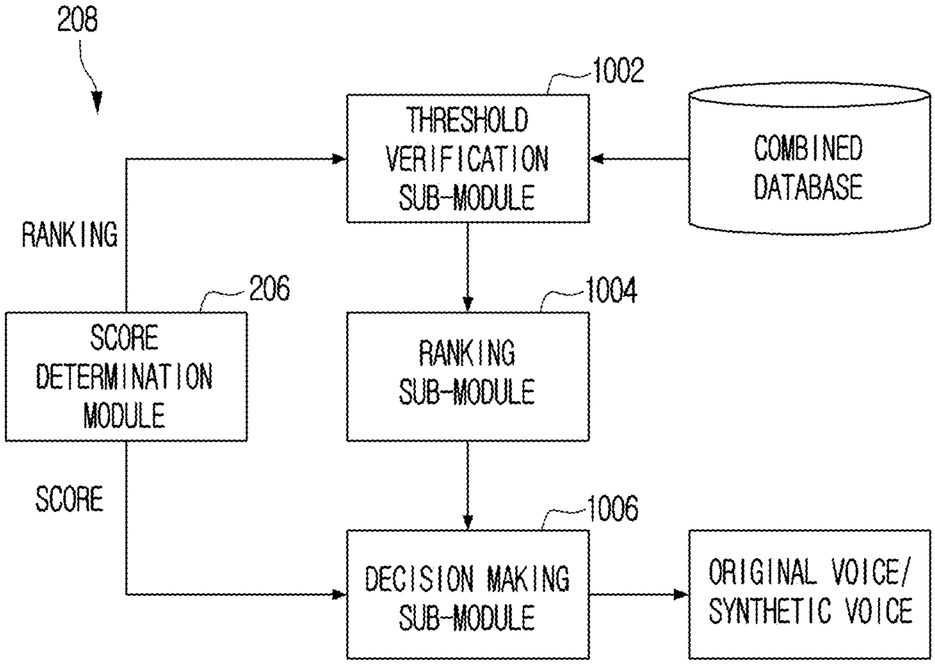
FIG. 10 depicts a block diagram of a decision module, according to one or more embodiments.

Referring to FIG. 10, a block diagram of the decision module 208 is depicted, according to one or more embodiments.

The decision module 208 may include a threshold verification sub-module 1002, a ranking sub-module 1004, and a decision making sub-module 1006. In one embodiment, the threshold verification sub-module 1002 may be configured to perform threshold verification of the ranking received from the score determination module 206. In case of a discrepancy, the threshold verification sub-module 1002 may be further configured to determine the dynamic threshold value based on the spatial and temporal features of the user's voice and the environmental factors stored in the combined database.

The ranking sub-module 1004 may be configured to re-perform ranking based on the determined dynamic threshold value and the decision making sub-module 1006 may be configured to determine if the user's voice is original voice by comparing the generated score with a dynamic threshold value. For example, the user's voice may be determined as the original voice if the generated score is above the dynamic threshold value and as the synthetic voice if the generated score is below the dynamic threshold value.

Figure 11:
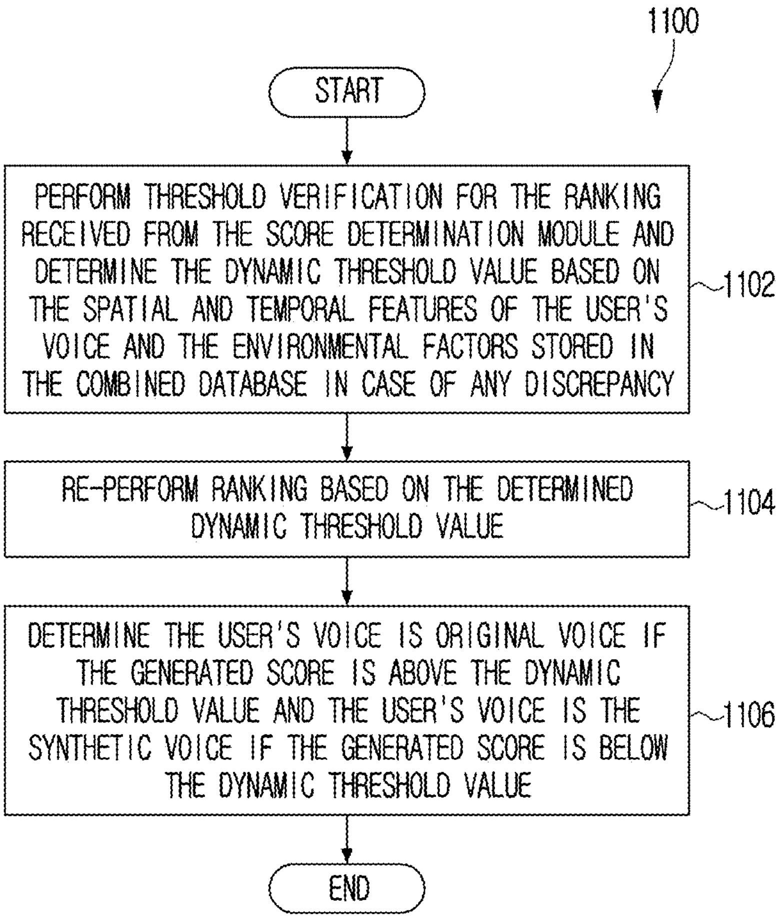
FIG. 11 depicts a flow diagram showing a method of determining the user's voice is an original voice or a synthetic voice by the decision module, according to one or more embodiments.

Referring to FIG. 11, a flow diagram showing a method 1100 of determining the user's voice is an original voice or a synthetic voice by the decision module is depicted, according to an embodiment. At operation 1102, threshold verification may be performed for the ranking received from the score determination module 206, and the dynamic threshold value may be determined based on the spatial and temporal features of the user's voice and the environmental factors stored in the combined database in case of any discrepancy. Ranking may be re-performed, at operation 1104, based on the determined dynamic threshold value. At operation 1106, the user's voice may be determined. The user's voice may be determined as original voice if the generated score is above the dynamic threshold value and as the synthetic voice if the generated score is below the dynamic threshold value.

The decision module 208 may activate a simulation module 210 to perform re-verification of the user's voice in case the generated score is close to the dynamic threshold value, as described with reference to FIG. 12.

Figure 12:
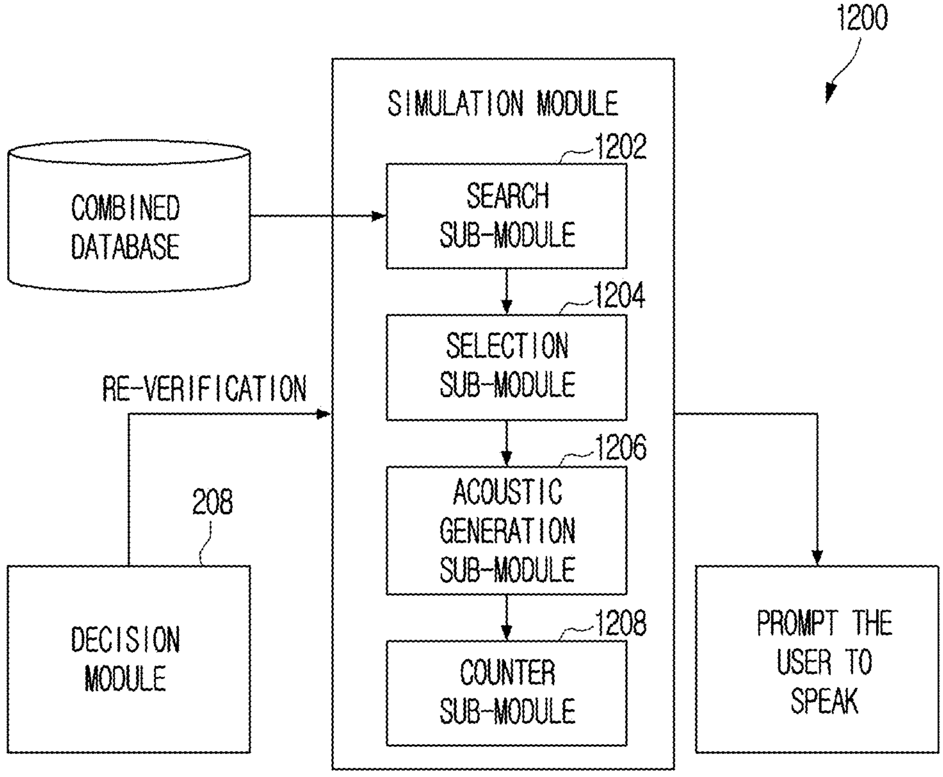
FIG. 12 depicts a block diagram of a simulation module, according to one or more embodiments.

Referring to FIG. 12, a block diagram 1200 of a simulation module 210 is depicted, according to an embodiment. As shown in FIG. 12, the simulation module 210 may be activated by the decision module 208 to perform re-verification of the user's voice. In one embodiment, the simulation module 210 may include a search sub-module 1202, a selection sub-module 1204, an acoustic generation sub-module 1206, and a counter sub-module 1208.

The search sub-module 1202 may be configured to perform a search in a combined database for phrases of spatial and temporal features that may be similar to the spatial and temporal features of received user's voice and the environmental factors. In one embodiment, the search sub-module 1202 may be configured to create a combined cost function for the received user's voice and the environmental factors, search the combined database, and determine phrases in which the cost function is at a minimum distance from the created combined cost function. The selection sub-module 1204 may be configured to select a phrase based on a least (minimum) variation from the searched phrases for a particular environment. The acoustic generation sub-module 1206 may be configured to simulate same environmental factors as the environment of the selected phrase using multiple IoT devices and prompting the user to speak the selected phrase for re-verification of the user's voice, as described with reference to FIGS. 13 to 15. The counter sub-module 1208 may be configured to count a number of times the re-verification of the user's voice is performed and to stop the re-verification based on reaching a predefined count. In one embodiment, the counter sub-module 1208 may be configured to select a re-verification question, count the re-verification question prompted to the user, and stop the re-verification on reaching the predefined (maximum) count.

Figure 13:
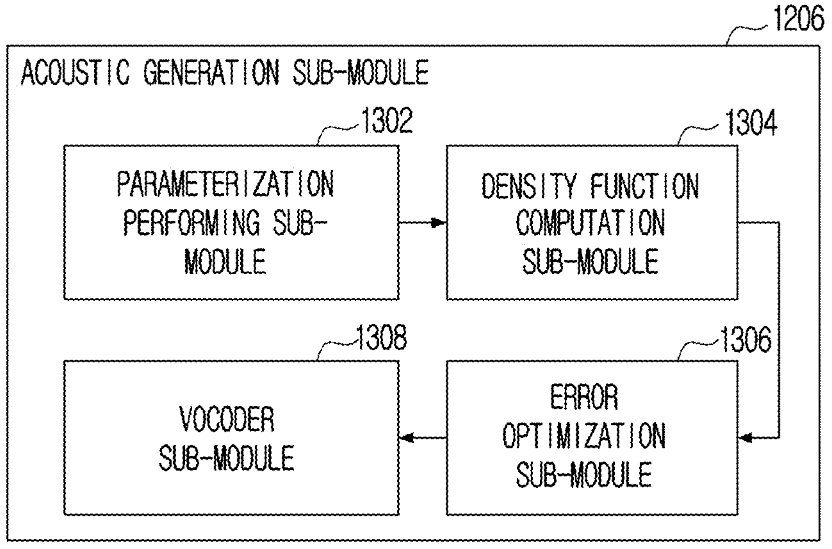
FIG. 13 depicts a block diagram of an acoustic generation sub-module, according to one or more embodiments.

Referring to FIG. 13, a block diagram of the acoustic generation sub-module 1206 is depicted, according to one or more embodiments. As shown in FIG. 13, the acoustic generation sub-module 1206 may include a parameterization performing sub-module 1302. In one embodiment, the parameterization performing sub-module 1302 may be and/or may include a Mel-based parameterization performing sub-module. The parameterization performing sub-module 1302 may be configured to perform an inverse of the natural logarithm function of the selected phrase. For example, the natural logarithm may be used as a transformation function to linearize data, which may facilitate analysis of the data and the inverse of the natural logarithm may be used to obtain the original values from the transformed data. The parameterization performing sub-module 1302 may be further configured to perform an inverse fast Fourier transform (IFFT) computation to transform a frequency domain signal back into a corresponding time domain signal. In an embodiment, the parameterization performing sub-module 1302 may be configured to perform framing of the output. Framing in the parameterization may refer to a process of dividing output of the IFFT computation into a series of relatively short overlapping frames.

The acoustic generation sub-module 1206 may further include a density function computation sub-module 1304 that may be configured to compute a probability density function. The acoustic generation sub-module 1206 may further include an error optimization sub-module 1306 that may be configured to minimize a difference and/or error between a predicted voice and the user's actual voice. For example, the acoustic generation sub-module 1206 may use a loss function, a cost function, or the like, to measure the discrepancy between the predicted voice and user's actual voice, and apply optimization techniques to determine the voice that minimizes the loss function. The acoustic generation sub-module 1206 may further include a vocoder sub-module 1308 that may be configured to synthesize voice from the user in real-time.

Figure 14:
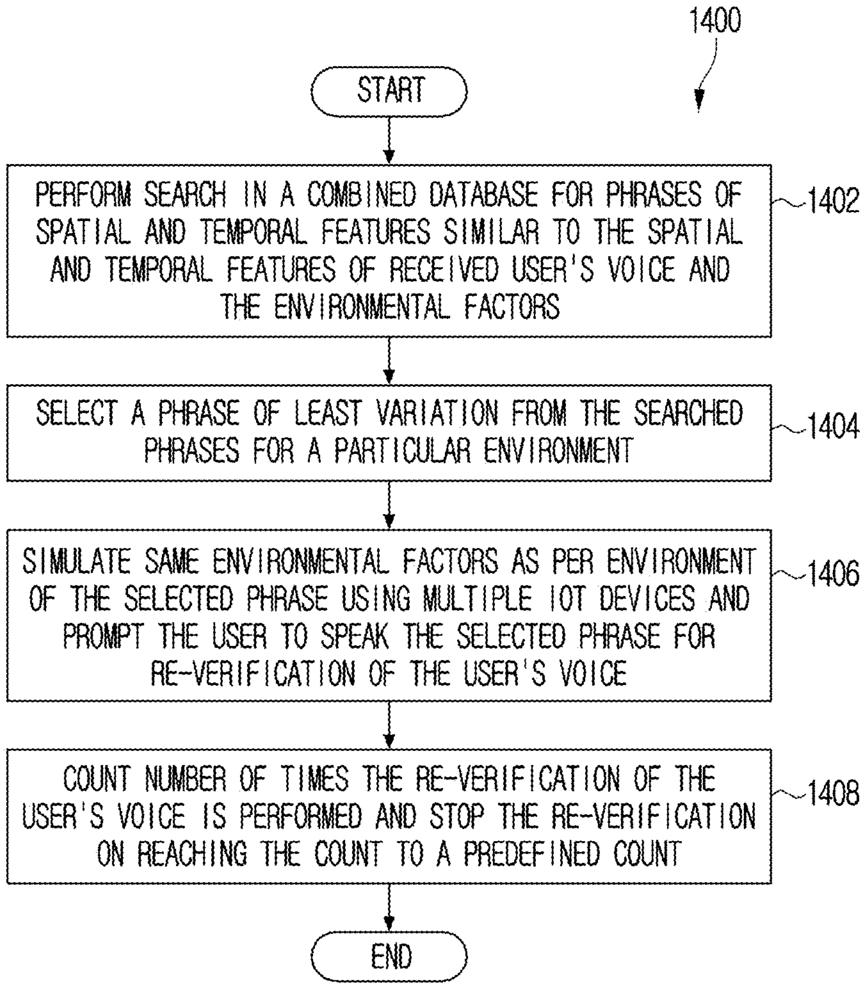
FIG. 14 depicts a flow diagram showing a method of performing re-verification of the user's voice by the simulation module, according to one or more embodiments.

Referring to FIG. 14, a flow diagram showing a method 1400 of performing re-verification of the user's voice by the simulation module is depicted, according to an embodiment. At operation 1402, a search may be performed in a combined database to find phrases with spatial and temporal features that may be similar to the spatial and temporal features of received user's voice and the environmental factors. At operation 1404, a phrase may be selected based on a least (minimum) variation from the searched phrases for a particular environment. At operation 1406, same environmental factors as per environment of the selected phrase may be simulated using multiple IoT devices and the user may be prompted to speak the selected phrase for re-verification of the user's voice. At operation 1408, a number of times that the re-verification of the user's voice is performed may be counted and the re-verification may be stopped, at operation 1408, based on reaching a predefined count. In one embodiment, the predefined count may be a user defined value.

Figure 15A:
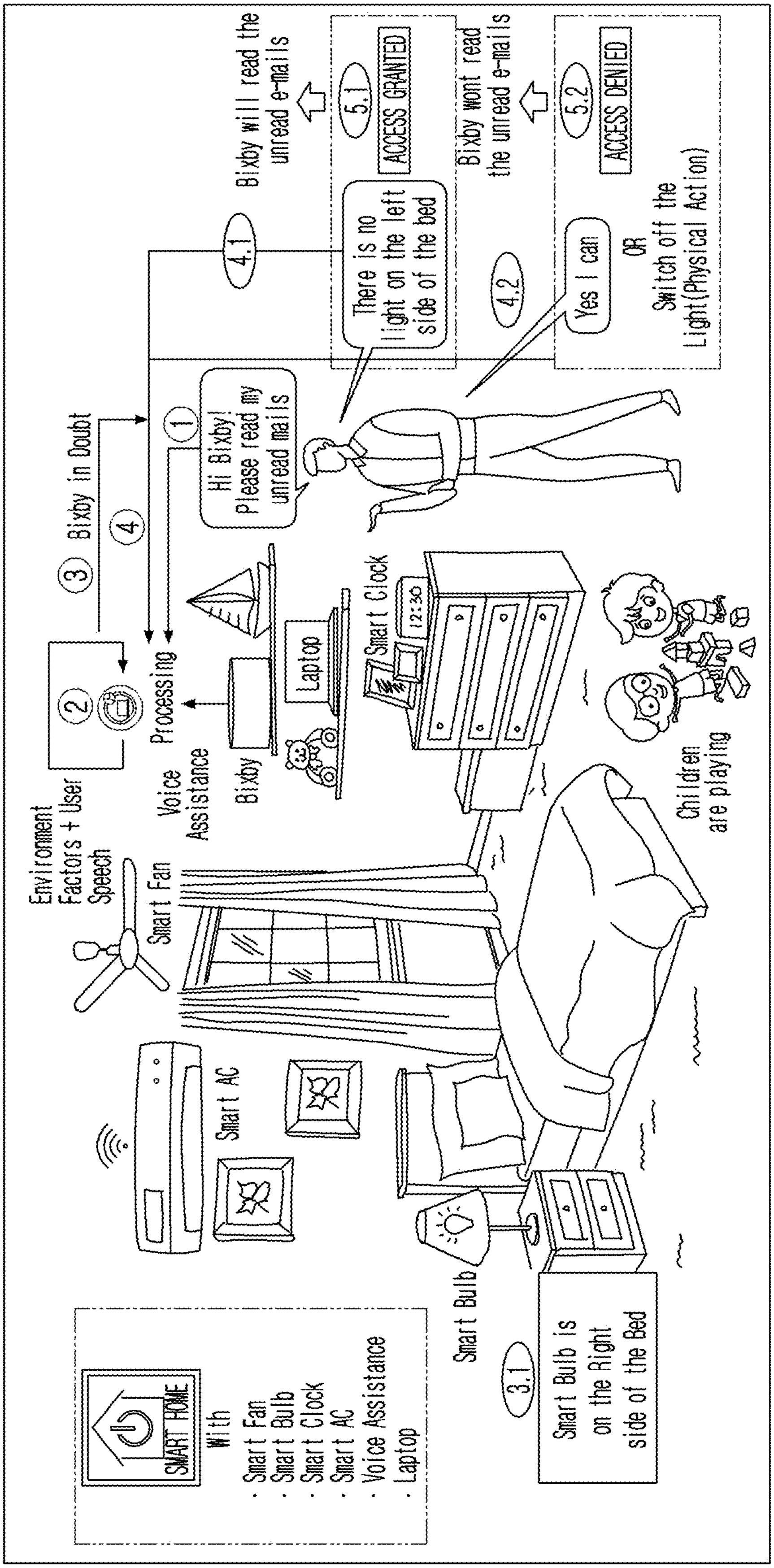
FIG. 15A depicts a first use case of distinguishing original voice from synthetic voice in an IoT environment, according to one or more embodiments.

Referring to FIG. 15A, a first use case of distinguishing original voice from synthetic voice in an IoT environment is depicted, according to one or more embodiments. As shown in FIG. 15A, the user may initiate a request to a voice assistant (e.g., Bixby) to read unread emails. Upon receiving the request, the voice assistant (e.g., Bixby), which may have been implemented with the present disclosure, may process the user's voice and environmental factors, doubt the user's voice (e.g., may be unable to determine whether the received voice is the actual user's voice or a synthetic voice), and may perform a re-verification by prompting the user to switch off the smart bulb located on the left side of the bed. In an embodiment, the user may be aware that there is no smart bulb located on the left side of the bed and may respond to the voice assistant (e.g., Bixby) accordingly, the voice assistant (e.g., Bixby) may determine, based on the response from the user, that the receive voice is the original voice and may proceed to read the unread email. Alternatively, if the user responds by indicating that the user is to switch off the light, and/or performs the action accordingly, the voice assistant (e.g., Bixby) may determine that that the received voice is a synthetic voice and may deny the request to read the unread email.

Figure 15B:
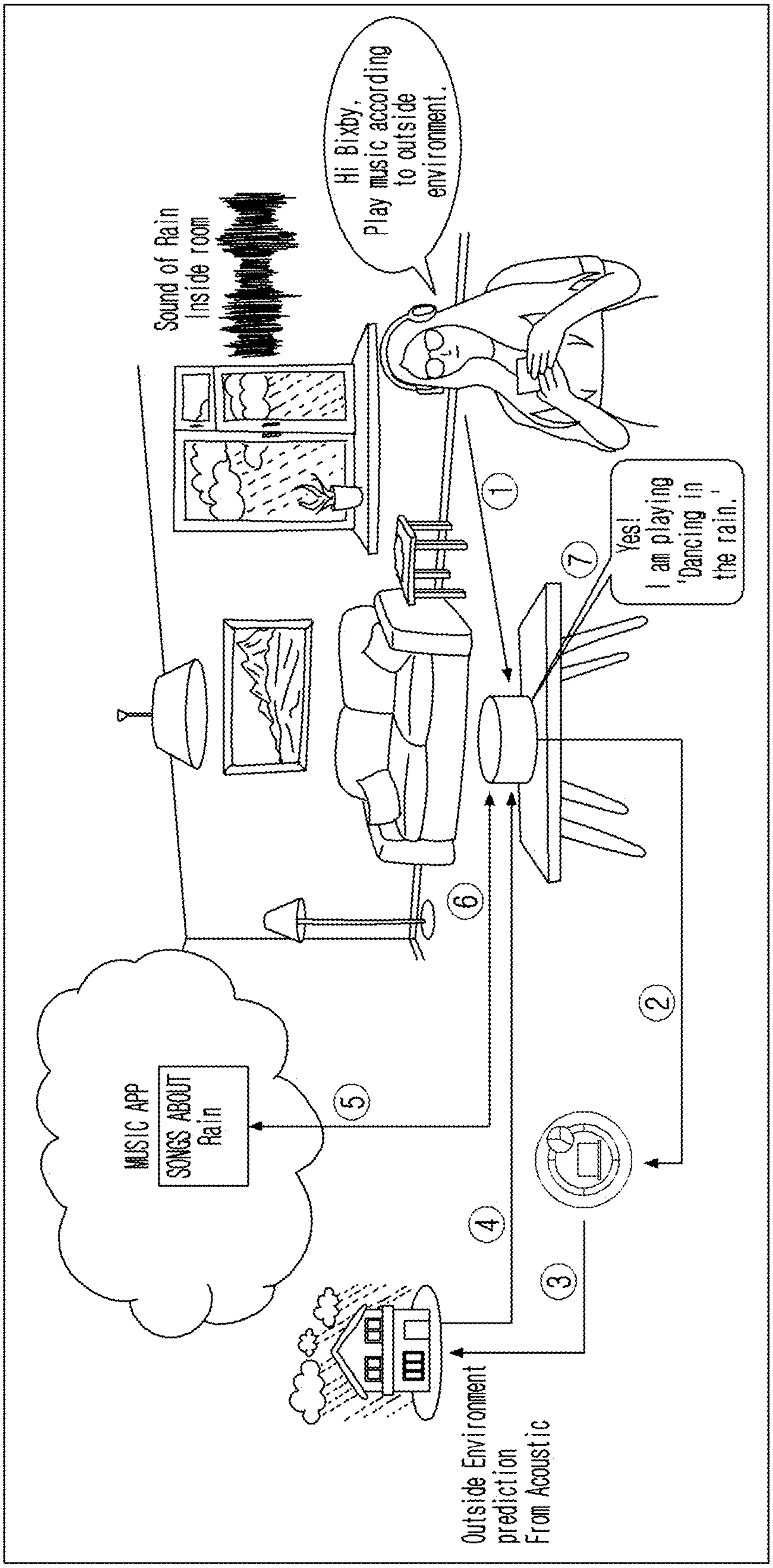
FIG. 15B depicts a second use case of distinguishing original voice from synthetic voice in an IoT environment, according to one or more embodiments according to an embodiment.

Referring to FIG. 15B, a second use case of distinguishing original voice from synthetic voice in an IoT environment is depicted, according to one or more embodiments. As shown in FIG. 15B, the user may initiate a request to a voice assistant (VA) to play music in accordance with the environment. Upon receiving the request, the VA, which may have been implemented with the present disclosure, may process the user's voice and environmental factors that may include ambient sounds like rain. The VA may select and play music that may be appropriate for the current environment (e.g., rain), thus potentially enhancing the user's overall listening experience.

Figure 16:
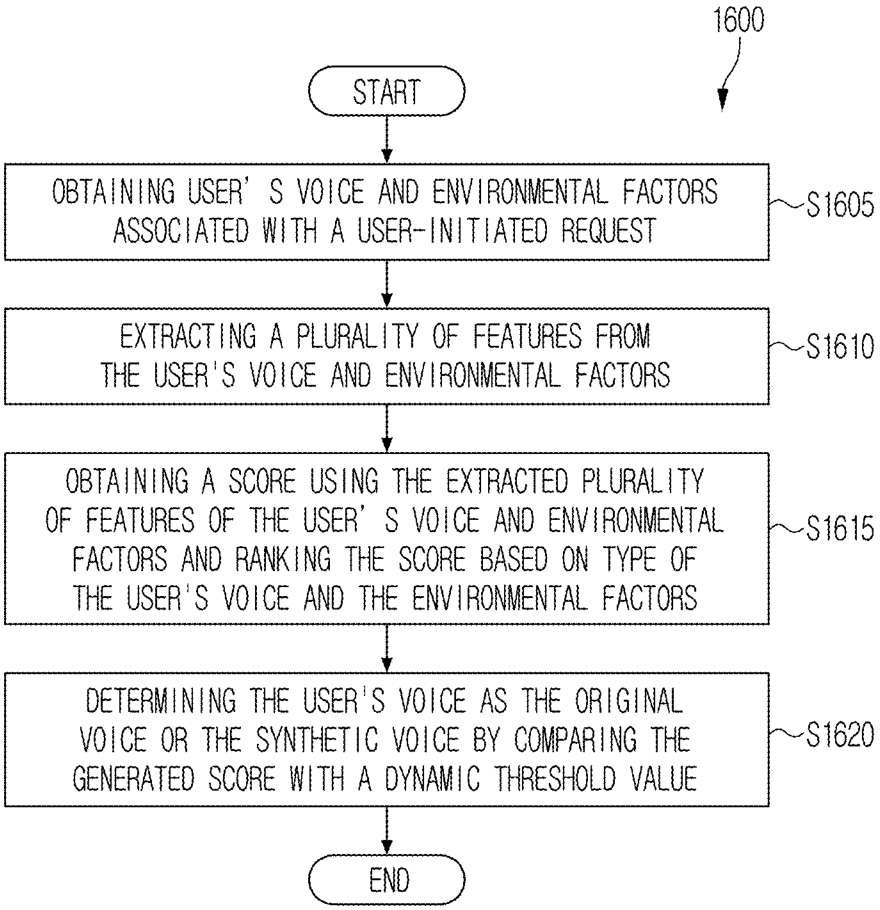
FIG. 16 depicts a flow diagram showing a method of distinguishing original voice from synthetic voice in the IoT environment, according to one or more embodiments.

FIG. 16 depicts a flow diagram showing a method 1600 of distinguishing original voice from synthetic voice in the IoT environment, according to one or more embodiments.

According to an embodiment, the method 1600 for controlling an electronic apparatus for distinguishing original voice from synthetic voice in an IoT environment includes obtaining, at operation S1605 by an acoustic separation module 202, user's voice and environmental factors associated with a user-initiated request, extracting, at operation S1610 by a feature extraction module 204, a plurality of features from the user's voice and environmental factors, obtaining, at operation S1615 by a score determination module 206, a score using the extracted plurality of features of the user's voice and environmental factors and ranking the score based on type of the user's voice and the environmental factors, and determining, at operation S1620 by a decision module 208, the user's voice as the original voice or the synthetic voice by comparing the generated score with a dynamic threshold value.

The method may include obtaining the user-initiated request. The user-initiated request include a request for filtering a user voice.

The method may include obtaining an input data including the user's voice and the environmental factors associated with the user-initiated request. The input data may include data that may be combination (or mix or synthesis) of the user's voice and the environmental factors.

The environmental factors may be described as environment information, environment audio, environment noise, or surrounding environment audio.

The obtaining at operation S1615 may be described as separating, dividing, filtering, or 'identifying.

The extracting at operation S1610 may be described as obtaining or identifying.

The plurality of features may be described as feature information.

The obtaining at operation S1605 may be described as generating or identifying.

The score may be described as score information. The score may be described as result degree or result information indicating a score.

The dynamic threshold value may be described as a predetermined value.

The user's voice may be determined as the original voice if the generated score is above the dynamic threshold value and as the synthetic voice if the generated score is below the dynamic threshold value.

The method may include determining, by the decision module 208, the user's voice as the original voice if the generated score is greater than the dynamic threshold value.

The method may include determining, by the decision module 208, the user's voice as the synthetic voice if the generated score is same or smaller than the dynamic threshold value.

The method may include performing, by a simulation module 1200, re-verification of the user's voice based on the generated score being the same as the dynamic threshold value.

The performing of the re-verification may include performing, by a search sub-module 1202, search in a combined database for phrases of spatial and temporal features that may be similar to the spatial and temporal features of received user's voice and the environmental factors, selecting, by a selection sub-module 1204, a phrase of least (minimum) variation from the searched phrases for a particular environment, simulating, by an acoustic generation sub-module 1206, same environmental factors as per environment of the selected phrase using multiple IoT devices and prompting the user to speak the selected phrase for re-verification of the user's voice, and counting, by a counter sub-module 1208, number of times the re-verification of the user's voice is performed and stopping the re-verification on reaching a predefined count.

The method may include identifying whether the generated score is the dynamic threshold value or not. For example, the method may include obtaining a difference value between the generated score and the dynamic threshold. The method may include identifying whether the difference value is within a threshold range. The method may include performing the re-verification of the user's voice based on the difference value being included the threshold range.

The operations for the re-verification may be performed by at least one of the search sub-module 1202, the selection sub-module 1204, the acoustic generation sub-module 1206, the or counter sub-module 1208.

The user's voice and environmental factors associated with the user-initiated request may be separated by performing operations that may include processing, by a signal processing sub-module 302, the user-initiated request which includes the user's voice and environmental factors, extracting, by a speaker verification sub-module 304, features from the processed user's voice and environmental factors and mapping the extracted features with features stored in a speaker database for determining the user which initiated the request, separating, by a separator and chunking sub-module 306, each channel of the user's voice and environmental factors, and combining each channel of the environmental factors together to generate two outputs including one for the user's voice and other for the environmental factors.

In an embodiment, the method may include identifying a first channel of the user's voice and a second channel of the environmental factors.

In an embodiment, the environmental factors may include a plurality of environmental factors. For example, the environmental factors may include a first environmental factor and second environmental factor. The method may include identifying a first channel of the user's voice, a second channel of the first environmental factor and a third channel of the second environmental factor. In addition, the method may include combining (or synthesizing) the second channel of the first environmental factor and the third channel of the second environmental factor into new channel (fourth channel).

The plurality of features may include spatial and temporal features of the user's voice and the environmental factors, the spatial features of the user's voice and the environmental factors may be extracted separately by performing operations that may include preprocessing the user's voice and the environmental factors separately, wherein the preprocessing includes performing normalization, pre-emphasis, and frame blocking, extracting features from the preprocessed user's voice and the environmental factors based on, but not limited to, frequency, energy, zero crossing rate and MFCC, and segregating features of the user's voice and the environmental factors by performing feature separation and dimension reduction.

The temporal features of the user's voice and the environmental factors may be extracted separately by performing operations that may include preprocessing the user's voice and the environmental factors separately, wherein the preprocessing includes performing normalization, pre-emphasis, and frame blocking, performing continuous wavelet transformation of the preprocessed user's voice and the environmental factors and generating a scalogram to visualize the transformation, and extracting features such as periodicity, aperiodicity, temporal changes and performing segregation of the extracted features of the user's voice and the environmental factors separately.

The score may be generated for the extracted plurality of features of the user's voice and environmental factors by performing operations that may include preprocessing, by a pre-processing sub-module 802, the plurality of features of the user's voice and environmental factors extracted by the feature extraction module 204, searching, by a property searching sub-module 804, one or more properties of each of the plurality of features, determining, by a peak based clustering sub-module 806, an upper specification limit and a lower specification limit of each of the plurality of features, performing, by a combination sub-module 808, multiple functions including determining type of the user's voice which includes regular voice and irregular voice and type of the environmental factors which includes known and unknown environmental factors based on past patterns or user history stored in the combined database, selecting appropriate kernel, and extracting plurality of features of the user's voice and environmental factors with respect to the selected kernel, and computing, by an optimization sub-module 810, the score using optimized plurality of features, and ranking the score based on determined type of the user's voice and the environmental factors, wherein the plurality of features may be optimized using a regression function.

The appropriate kernel may be selected from a plurality of kernels by comparing combined feature vectors of each kernel with cost function and selecting the kernel which may be having the least distance from the cost function.

The plurality of features of the user's voice may include spatial features of the user's voice such as, but not limited to, fundamental frequency, formant frequency, speech variability, amplitude, and falling amplitude and the temporal features of the user's voice may include, but not be limited to, pause duration, maximum pause duration, minimum pause duration, and zero crossing rate.

The plurality of features of the environmental factors may include spatial features of the environmental factors such as, but not limited to, spectral band energy, spectral flux, spectral maxima, raising amplitude, falling amplitude, and the temporal features of the environmental factors may include, but not be limited to, pause duration, maximum pause duration, minimum pause duration, periodicity, and aperiodicity.

The determination of the user's voice may include performing operations such as, but not limited to, performing threshold verification, by a threshold verification sub-module 1002, for the ranking received from the score determination module 206, and determining the dynamic threshold value based on the spatial and temporal features of the user's voice and the environmental factors stored in the combined database in case of any discrepancy, re-performing ranking, by a ranking sub-module 1004, based on the determined dynamic threshold value, and determining, by a decision making sub-module 1006, the user's voice is original voice if the generated score is above the dynamic threshold value and the user's voice is the synthetic voice if the generated score is below the dynamic threshold value.

According to an embodiment, an electronic apparatus for distinguishing original voice from synthetic voice in an IoT environment includes at least one processor that may be configured to separate (operation 102), by an acoustic separation module 202, user's voice and environmental factors associated with a user-initiated request, extract (operation 104), by a feature extraction module 204, a plurality of features from the user's voice and environmental factors, generate (operation 106), by a score determination module 206, a score using the extracted plurality of features of the user's voice and environmental factors and ranking the score based on type of the user's voice and the environmental factors, and determine (operation 108), by a decision module 208, the user's voice as the original voice or the synthetic voice by comparing the generated score with a dynamic threshold value.

The user's voice may be determined as the original voice if the generated score is above the dynamic threshold value and as the synthetic voice if the generated score is below the dynamic threshold value.

The at least one processor may be further configured to perform, by a simulation module 1200, re-verification of the user's voice in case the generated score is substantially similar or equal to the dynamic threshold value. The performing re-verification may include performing, by a search sub-module 1202, search in a combined database for phrases of spatial and temporal features similar to the spatial and temporal features of received user's voice and the environmental factors, selecting, by a selection sub-module 1204, a phrase of least variation from the searched phrases for a particular environment, simulating, by an acoustic generation sub-module 1206, same environmental factors as per environment of the selected phrase using multiple IoT devices and prompting the user to speak the selected phrase for re-verification of the user's voice, and counting, by a counter sub-module 1208, number of times the re-verification of the user's voice is performed and stopping the re-verification on reaching the counting to a predefined count.

The user's voice and environmental factors associated with the user-initiated request may be separated by performing operations that may include processing, by a signal processing sub-module 302, the user-initiated request which includes the user's voice and environmental factors, extracting, by a speaker verification sub-module 304, features from the processed user's voice and environmental factors and mapping the extracted features with features stored in a speaker database for determining the user which initiated the request, separating, by a separator and chunking sub-module 306, each channel of the user's voice and environmental factors, and combining each channel of the environmental factors together to generate two outputs including one for the user's voice and other for the environmental factors.

It may be apparent that aspects of the present disclosure provide for a system and a method for distinguishing the original voice from the synthetic voice in the IoT environment. Such a system and method may undergo numerous modifications and variants, all of which are covered by the same innovative concept, moreover, all of the details may be replaced by technically equivalent elements. The scope of protection of the present disclosure is therefore defined by the attached claims.

What is claimed is:

1. A method of controlling an electronic apparatus for distinguishing original voice from synthetic voice, the method comprising:

obtaining a voice of a user and environmental factors associated with a user-initiated request;

extracting a first plurality of features from the voice of the user and the environmental factors;

selecting a kernel based on a type of the voice of the user and a type of the environmental factors;

extracting a second plurality of features of the voice of the user and the environmental factors based on the kernel;

obtaining a score using the second plurality of features and ranking the score based on the type of the voice of the user and the type of the environmental factors; and determining the voice of the user as the original voice or the synthetic voice by comparing the ranked score with a dynamic threshold value.

2. The method of claim 1, wherein the determining the voice of the user as the original voice of the synthetic voice comprises:

determining the voice of the user as the original voice based on the ranked score being above the dynamic threshold value; and determining the voice of the user as the synthetic voice in an Internet of Things (IoT) environment based on the ranked score being below the dynamic threshold value.

3. The method of claim 1, further comprising:

performing re-verification of the voice of the user based on the ranked score being equal to the dynamic threshold value, wherein the performing the re-verification comprises:

performing a search in a combined database for phrases of spatial features and temporal features that are similar to spatial features and temporal features of the voice of the user and the environmental factors;

selecting, from among the searched phrases, a phrase of least variation for an environment;

simulating environmental factors of the environment of the selected phrase using multiple IoT devices;

prompting the user to speak the selected phrase for the re-verification of the voice of the user;

counting a number of times the re-verification of the voice of the user is performed; and stopping the re-verification based on the number of times reaching a predefined count value.

4. The method of claim 1, further comprising:

processing the user-initiated request comprising the voice of the user and the environmental factors;

extracting a third plurality of features from the processed voice of the user and the environmental factors;

mapping the third plurality of features to features stored in a speaker database;

identifying, based on the mapping, the user that initiated the user-initiated request;

separating each channel of the voice of the user and the environmental factors; and generating a first output comprising a first channel of the voice of the user and a second output comprising a combination of each channel of the environmental factors.

5. The method of claim 1, wherein the first plurality of features comprises spatial features and temporal features of the voice of the user and the environmental factors, and wherein the extracting the first plurality of features comprises:

separately preprocessing the voice of the user and the environmental factors, wherein the preprocessing comprises performing normalization, pre-emphasis, and frame blocking;

extracting the first plurality of features from the preprocessed voice of the user and the preprocessed environmental factors based on at least one of frequency, energy, zero crossing rate, or Mel-frequency cepstral coefficients (MFCC); and segregating the first plurality of features of the voice of the user and the environmental factors by performing feature separation and dimension reduction.

6. The method of claim 5, wherein the extracting the first plurality of features from the preprocessed voice of the user and the preprocessed environmental factors comprises:

performing continuous wavelet transformation of the preprocessed voice of the user and the preprocessed environmental factors and generating a scalogram that visualizes the transformation;

extracting the first plurality of features comprising at least one of periodic changes, aperiodic changes, or temporal changes; and separately performing the segregating of the first plurality of features.

7. The method of claim 1, wherein the obtaining the score comprises:

preprocessing the second plurality of features;

searching one or more properties of each of the second plurality of features;

determining an upper specification limit and a lower specification limit of each of the second plurality of features;

determining the type of the voice of the user, the first type of the voice of the user comprising at least one of a regular voice or an irregular voice;

determining the type of the environmental factors based on at least one of past patterns or user history stored in a combined database, the type of the environmental factors comprising at least one of known environmental factors or unknown environmental factors; and computing the score using an optimized plurality of features, and ranking the score based on the first type of the voice of the user and the type of the environmental factors, wherein the optimized plurality of features comprise a portion of the second plurality of features optimized using a regression function.

8. The method of claim 7, wherein the selecting the kernel comprises:

selecting the kernel from a plurality of kernels by comparing combined feature vectors of each kernel of the plurality of kernels using a cost function and selecting the kernel having a minimum distance based on the cost function.

9. The method of claim 7, wherein the second plurality of features of the voice of the user comprise at least one of spatial features of the voice of the user or temporal features of the voice of the user, wherein the spatial features of the voice of the user comprise at least one of a fundamental frequency, a formant frequency, a speech variability, an amplitude, or a falling amplitude, and wherein the temporal features of the voice of the user comprise at least one of a pause duration, a maximum pause duration, a minimum pause duration, or a zero crossing rate.

10. The method of claim 7, wherein the second plurality of features of the environmental factors comprise at least one of spatial features of the environmental factors or temporal features of the environmental factors, wherein the spatial features of the environmental factors comprise at least one of a spectral band energy, a spectral flux, a spectral maxima, a raising amplitude, or a falling amplitude, and wherein the temporal features of the environmental factors comprise at least one of a pause duration, a maximum pause duration, a minimum pause duration, a periodicity, or an aperiodicity.

11. The method of claim 1, wherein the determining the voice of the user as the original voice or the synthetic voice comprises:

performing threshold verification of the ranked score;

determining the dynamic threshold value based on spatial features and temporal features of the voice of the user and the environmental factors stored in a combined database;

re-performing ranking based on the dynamic threshold value;

determining that the voice of the user is the original voice based on the ranked score being above the dynamic threshold value; and determining that the voice of the user is the synthetic voice based on the ranked score being below the dynamic threshold value.

12. An electronic apparatus for distinguishing original voice from synthetic voice, the electronic apparatus comprising:

memory storing instructions; and one or more processors operatively coupled to the memory, wherein the instructions, when executed by the one or more processors individually or collectively, cause the electronic apparatus to:

obtain a voice of a user and environmental factors associated with a user-initiated request;

extract a first plurality of features from the voice of the user and the environmental factors;

select a kernel based on a type of the voice of the user and a type of the environmental factors;

extract a second plurality of features of the voice of the user and the environmental factors based on the kernel;

obtain a score using the second plurality of features and ranking the score based on the type of the voice of the user and the type of the environmental factors; and determine the voice of the user as the original voice or the synthetic voice in an Internet of Things (IoT) environment by comparing the ranked score with a dynamic threshold value.

13. The electronic apparatus of claim 12, wherein the instructions, when executed by the one or more processors individually or collectively, cause the electronic apparatus to:

determine the voice of the user as the original voice based on the ranked score being above the dynamic threshold value; and determine the voice of the user as the synthetic voice based on the ranked score being below the dynamic threshold value.

14. The electronic apparatus of claim 12, wherein the instructions, when executed by the one or more processors individually or collectively, cause the electronic apparatus to:

perform re-verification of the voice of the user based on the ranked score being equal to the dynamic threshold value, wherein to perform the re-verification of the voice of the user comprises:

perform a search in a combined database for phrases of spatial features and temporal features that are similar to spatial features and temporal features of the voice of the user and the environmental factors;

select, from among the searched phrases, a phrase of least variation for an environment;

simulate environmental factors of the environment of the selected phrase using multiple IoT devices;

prompt the user to speak the selected phrase for the re-verification of the voice of the user;

count a number of times the re-verification of the voice of the user is performed; and stop the re-verification based on the number of times reaching a predefined count value.

15. The electronic apparatus of claim 12, wherein the instructions, when executed by the one or more processors individually or collectively, cause the electronic apparatus to:

process the user-initiated request comprising the voice of the user and the environmental factors;

extract a third plurality of features from the processed voice of the user and the processed environmental factors;

map the third plurality of features to features stored in a speaker database;

identify, based on the map, the user that initiated the user-initiated request;

separate each channel of the voice of the user and the environmental factors; and generate a first output comprising a first channel of the voice of the user and a second output comprising a combination of each channel of the environmental factors.

16. The electronic apparatus of claim 12, wherein the first plurality of features comprises spatial features and temporal features of the voice of the user and the environmental factors, and wherein the instructions, when executed by the one or more processors individually or collectively, cause the electronic apparatus to:

separately preprocess the voice of the user and the environmental factors, wherein the preprocessing comprises performing normalization, pre-emphasis, and frame blocking;

extract the first plurality of features from the preprocessed voice of the user and the preprocessed environmental factors based on at least one of frequency, energy, zero crossing rate, or Mel-frequency cepstral coefficients (MFCC); and segregate the first plurality of features of the voice of the user and the environmental factors by performing feature separation and dimension reduction.

17. The electronic apparatus of claim 16, wherein the instructions, when executed by the one or more processors individually or collectively, cause the electronic apparatus to:

perform continuous wavelet transformation of the preprocessed voice of the user and the preprocessed environmental factors and generating a scalogram that visualizes the transformation;

extract the first plurality of features comprising at least one of periodic changes, aperiodic changes, or temporal changes; and separately perform the segregating of the first plurality of features.

18. The electronic apparatus of claim 12, wherein the instructions, when executed by the one or more processors individually or collectively, cause the electronic apparatus to:

preprocess the second plurality of features;

search one or more properties of each of the second plurality of features;

determine an upper specification limit and a lower specification limit of each of the second plurality of features;

determine the type of the voice of the user, the first type of the voice of the user comprising at least one of a regular voice or an irregular voice;

determine the type of the environmental factors based on at least one of past patterns or user history stored in a combined database, the type of the environmental factors comprising at least one of known environmental factors or unknown environmental factors; and compute the score using an optimized plurality of features, and rank the score based on the type of the voice of the user and the type of the environmental factors, wherein the optimized plurality of features comprise a portion of the second plurality of features optimized using a regression function.

19. The electronic apparatus of claim 18, wherein the instructions, when executed by the one or more processors individually or collectively, cause the electronic apparatus to:

select the kernel from a plurality of kernels by comparing combined feature vectors of each kernel of the plurality of kernels using a cost function and selecting the kernel having a minimum distance based on the cost function.

20. The electronic apparatus of claim 12, wherein the instructions, when executed by the one or more processors individually or collectively, cause the electronic apparatus to:

perform threshold verification of the ranked score;

determine the dynamic threshold value based on spatial features and temporal features of the voice of the user and the environmental factors stored in a combined database;

re-perform ranking based on the dynamic threshold value;

determine that the voice of the user is the original voice based on the ranked score being above the dynamic threshold value; and determine that the voice of the user is the synthetic voice based on the ranked score being below the dynamic threshold value.

* * * * *